US011792251B2

(12) United States Patent
Trim et al.

(10) Patent No.: US 11,792,251 B2
(45) Date of Patent: Oct. 17, 2023

(54) MEDIA STREAM NETWORK ACTION DECISIONS

(71) Applicant: International Business Machines Corporation, Armonk, NY (US)

(72) Inventors: Craig M. Trim, Ventura, CA (US); Kimberly Greene Starks, Nashville, TN (US); Michael E. Alexander, Great Falls, VA (US); Gandhi Sivakumar, Victoria (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/734,777

(22) Filed: Jan. 6, 2020

(65) Prior Publication Data

US 2021/0211479 A1    Jul. 8, 2021

(51) Int. Cl.
*H04L 65/75*  (2022.01)
*H04L 65/80*  (2022.01)
*G10L 15/26*  (2006.01)
*H04L 67/55*  (2022.01)

(52) U.S. Cl.
CPC .............. *H04L 65/75* (2022.05); *G10L 15/26* (2013.01); *H04L 65/80* (2013.01); *H04L 67/55* (2022.05)

(58) Field of Classification Search
CPC ....... H04L 65/601; H04L 65/80; H04L 67/26; H04L 65/75; H04L 67/55
See application file for complete search history.

(56) References Cited

U.S. PATENT DOCUMENTS

| 9,471,671 B1 | 10/2016 | Juang |
| 10,133,961 B2 | 11/2018 | Raghuraman |
| 10,178,422 B1 * | 1/2019 | Panchaksharaiah ........ H04N 21/458 |

(Continued)

FOREIGN PATENT DOCUMENTS

| WO | WO2016109131 | 7/2016 |
| WO | WO2018217267 A1 | 11/2018 |

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Andrew C Georgandellis
(74) *Attorney, Agent, or Firm* — Nicholas Welling; George S. Blasiak; Heslin Rothenberg Farley & Mesiti P.C.

(57) ABSTRACT

Methods, computer program products, and systems are presented. The method computer program products, and systems can include, for instance: transmitting, during a media streaming session, streaming media to a user equipment (UE) device of a user, the transmitting streaming media including simultaneously transmitting a first media stream and a second media stream to the UE device; subjecting the first media stream to processing by natural language processing to provide a topic extracted from the first media stream; subjecting the second media stream to processing by natural language processing to provide an extracted topic extracted from the second media stream; identifying a match between the topic and the extracted topic; and providing one or more output in response to the identifying the match between the topic and the extracted topic.

20 Claims, 10 Drawing Sheets

(56) References Cited

U.S. PATENT DOCUMENTS

| | | | | |
|---|---|---|---|---|
| 10,484,911 | B1* | 11/2019 | Bogineni | H04W 76/10 |
| 2005/0198525 | A1* | 9/2005 | Trossen | H04L 67/5683 |
| | | | | 726/22 |
| 2007/0180436 | A1* | 8/2007 | Travostino | G06F 9/4856 |
| | | | | 717/138 |
| 2009/0192961 | A1* | 7/2009 | Fithian | H04N 19/162 |
| | | | | 706/46 |
| 2010/0331023 | A1 | 12/2010 | Cai et al. | |
| 2012/0002544 | A1* | 1/2012 | Kokku | H04L 47/2441 |
| | | | | 370/232 |
| 2015/0356442 | A1 | 12/2015 | Chawla et al. | |
| 2016/0286244 | A1* | 9/2016 | Chang | H04N 21/4788 |
| 2017/0019446 | A1 | 1/2017 | Son et al. | |
| 2017/0054595 | A1* | 2/2017 | Zhang | H04L 41/0896 |
| 2017/0064591 | A1* | 3/2017 | Padfield | H04W 24/06 |
| 2017/0237607 | A1* | 8/2017 | Smith | H04L 67/142 |
| | | | | 709/223 |
| 2018/0004558 | A1* | 1/2018 | Das Sharma | G06F 13/1663 |
| 2018/0189303 | A1 | 7/2018 | Mankovskii | |
| 2018/0302877 | A1* | 10/2018 | Bosch | H04W 84/00 |
| 2018/0316627 | A1* | 11/2018 | Cui | H04L 47/808 |
| 2020/0112492 | A1* | 4/2020 | Chatras | H04L 41/5096 |
| 2021/0160153 | A1* | 5/2021 | Akman | H04L 41/0896 |
| 2021/0168031 | A1* | 6/2021 | Stockert | H04L 41/0806 |
| 2022/0022090 | A1* | 1/2022 | Schliwa-Bertling | |
| | | | | H04W 28/0268 |
| 2022/0104079 | A1* | 3/2022 | Karapantelakis | H04L 67/10 |

OTHER PUBLICATIONS

T. Saboorian, "*Network Slicing and 3GPP Service and Systems Aspects (SA) Standard*", IEEE Softwarization, https://sdn.ieee.org/newsletter/december-2017/network-slicing-and-3gpp-service-and-systems-aspects-sa-standard, Dec. 2017.

K. Sparks, "*5G Network Slicing Whitepaper*", FCC Technological Advisory Council 5G IoT Working Group, https://transition.fcc.gov/bureaus/oet/tac/tacdocs/reports/2018/5G-Network-Slicing-Whitepaper-Finalv80.pdf.

3rd Generation Partnership Project: Technical Specification Group Services and System Aspects: Management and Orchestration Provisioning (Release16) 3GPP TS 28.531 V16.2.0; (Jun. 2019).

Wikipedia; Content Delivery Network; https://en.wikipedia.org/wiki/Content_delivery_network; Dec. 19, 2019; 13 pages.

IBM Watson—Speech to text service; https://cloud.IBM.com/docs/speech-to-text?topic=speech-to-text- release-notes; 2019; 9 pages.

Global Dossier Report; U.S. Appl. No. 16/734,777; Jul. 28, 2023; 1 page.

Global Dossier Report; U.S. Appl. No. 16/734,777; Aug. 28, 2023; 1 page.

* cited by examiner

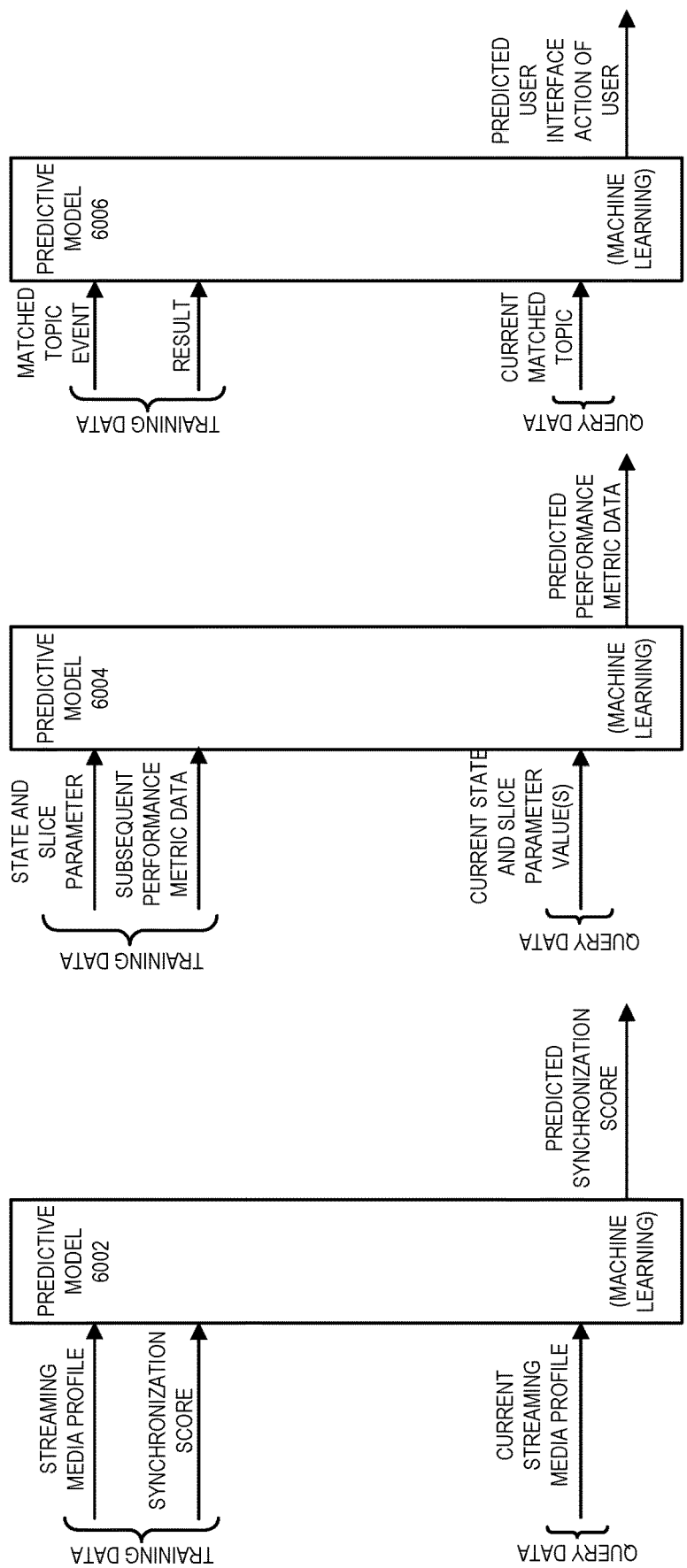

MEDIA STREAM NETWORK ACTION DECISIONS

FIELD

Embodiments herein relate to network based data communications wherein data can be transmitted and/or received over a network.

BACKGROUND

A network service can include an application running at the network application layer and above, that provides data storage, manipulation, presentation, communication or other capability which is often implemented using a client-server architecture based on application layer network protocols. Each network service is usually provided by a server component running on one or more computers and accessed via a network by client components running on other devices. However, client and server components may both run on the same machine. In addition, a dedicated server computer may offer multiple network services concurrently.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

Network function virtualization (NFV) refers to a network architecture that uses the technologies of IT virtualization to virtualize entire classes of network node functions into building blocks that may connect, or chain together, to create communication services. NFV relies upon, but differs from, traditional server-virtualization techniques, such as those used in enterprise IT. A virtualized network function, or VNF, may consist of one or more virtual machines running different software and processes, on top of standard high-volume servers, switches and storage devices, or even cloud computing infrastructure, instead of having custom hardware appliances for each network function.

SUMMARY

Shortcomings of the prior art are overcome, and additional advantages are provided, through the provision, in one aspect, of a method. The method can include, for example: transmitting, during a media streaming session, streaming media to a user equipment (UE) device of a user, the transmitting streaming media including simultaneously transmitting a first media stream and a second media stream to the UE device; subjecting the first media stream to processing by natural language processing to provide a topic extracted from the first media stream; subjecting the second media stream to processing by natural language processing to provide an extracted topic extracted from the second media stream; identifying a match between the topic and the extracted topic; and providing one or more output in response to the identifying the match between the topic and the extracted topic.

In another aspect, a computer program product can be provided. The computer program product can include a computer readable storage medium readable by one or more processing circuit and storing instructions for execution by one or more processor for performing a method. The method can include, for example: transmitting, during a media streaming session, streaming media to a user equipment (UE) device of a user, the transmitting streaming media including simultaneously transmitting a first media stream and a second media stream to the UE device; subjecting the first media stream to processing by natural language processing to provide a topic extracted from the first media stream; subjecting the second media stream to processing by natural language processing to provide an extracted topic extracted from the second media stream; identifying a match between the topic and the extracted topic; and providing one or more output in response to the identifying the match between the topic and the extracted topic.

In a further aspect, a system can be provided. The system can include, for example a memory. In addition, the system can include one or more processor in communication with the memory. Further, the system can include program instructions executable by the one or more processor via the memory to perform a method. The method can include, for example: transmitting, during a media streaming session, streaming media to a user equipment (UE) device of a user, the transmitting streaming media including simultaneously transmitting a first media stream and a second media stream to the UE device; subjecting the first media stream to processing by natural language processing to provide a topic extracted from the first media stream; subjecting the second media stream to processing by natural language processing to provide an extracted topic extracted from the second media stream; identifying a match between the topic and the extracted topic; and providing one or more output in response to the identifying the match between the topic and the extracted topic.

Shortcomings of the prior art are overcome, and additional advantages are provided, through the provision, in one aspect, of a method. The method can include, for example: transmitting, during a media streaming session, streaming media to a user equipment (UE) device of a user, the transmitting streaming media including transmitting a media stream to the UE device; subjecting the stream to processing; and providing one or more output in response to the processing.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts a predictive model that can be trained with use of machine learning training processes according to one embodiment;

FIG. 6B depicts a predictive model that can be trained with use of machine learning training processes according to one embodiment;

FIG. 6C depicts a predictive model that can be trained with use of machine learning training processes according to one embodiment;

DETAILED DESCRIPTION

Figure 1A:
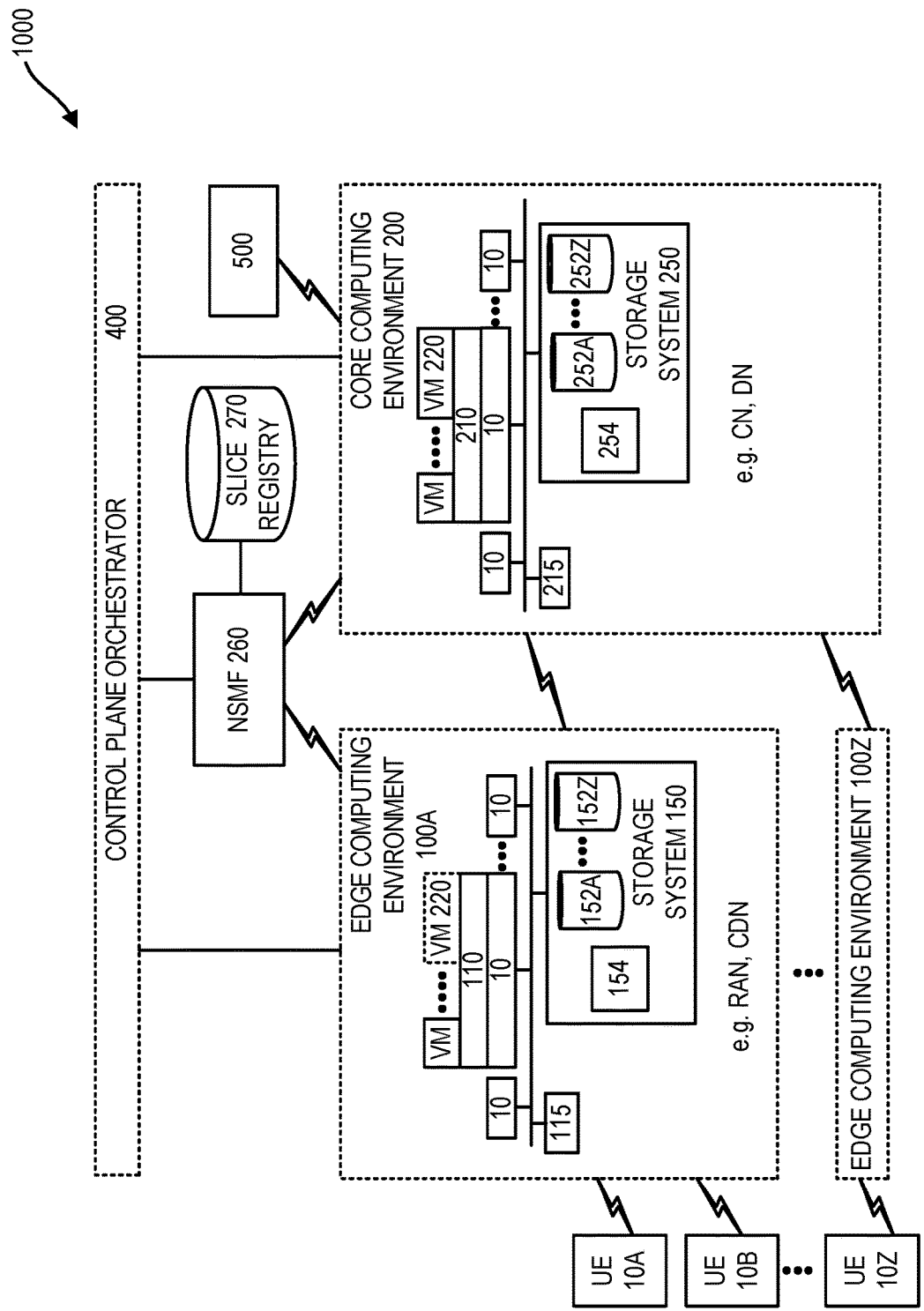
FIG. 1A depicts a system having a computing node of a core computing environment, a computing node of an edge computing environment, and a user equipment (UE) device according to one embodiment.

FIG. 1A illustrates system 1000 for providing streaming media to a user. System 1000 can include one or more computing node 10 disposed in core computing environment 200, one or more computing node 10 disposed in one or more edge computing environment 100A-100Z, and user equipment (UE) devices 10A-10Z which can be computing node based devices. UE devices 10A-10Z can connect to core computing environment 200 through multiple different edge computing environments 100A-100Z.

Each of the different UE devices 10A-10Z can be associated to a different user. Regarding UE devices 10A-10Z, a UE device of UE devices 10A-10Z in one embodiment can be a computing node device provided by a client computer, e.g. a mobile device, e.g. a smartphone or tablet, a laptop, smartwatch or PC.

Referring to FIG. 1A, edge computing environment 100A can be characterized by being closer in location proximity to a UE device to which it is connected, such as UE device 10A than core computing environment 200. According to one embodiment, edge computing environment 100A can include, e.g. an access network (AN) such as a radio access network (RAN) and/or a content delivery network (CDN). According to one embodiment, core computing environment 200 can include, e.g. a mobility core network (CN) and/or a data network (DN). According to one embodiment, edge computing environment 100A (closer in proximity to a connecting UE device) can include a mobility CN and core computing environment 200 can include a DN. According to one embodiment a RAN can include various types of facilities, including small cells, masts, and dedicated systems that connect mobile users and wireless devices to a core network. RAN cells can include small cells and macro cells. Small cells can feature, e.g. Fifth Generation (5G) networks at millimeter wave frequencies according to one embodiment. To provide continuous connection, small cells can be distributed in clusters depending on where users require connection. 5G macro cells can use multiple input multiple output (MIMO) antennas that have multiple connections to send and receive more data simultaneously. According to one embodiment, core computing environment 200 can include computing nodes of one or more web hosting data center which one or more data center can include at least one single tenant data center and/or at least one multi-tenant data center. According to one embodiment, a mobility CN can comprise a mobile exchange and data network that manages mobile voice data and internet connections and to provide access to core computing environment services. Computing nodes of edge computing environment 100A, according to one embodiment, can be configured as 5G compliant compute nodes. 5G compliant compute nodes can be featured to support network function virtualization (NFV). In accordance with NFV, network functions historically provided by dedicated hardware device can be instantiated at non-dedicated computing nodes within an edge computing environment such as within a RAN, a CDN, and/or mobility CN.

Core computing environment 200 can include storage system 250 having storage devices 252A-252Z. Storage system 250 is shown, in the embodiment of FIG. 1A, as a shared storage system shared by computing nodes 10 of core computing environment 200, but computing nodes 10 can alternatively have dedicated storage. Computing nodes 10 can be provided by physical computing nodes. Storage system 250 can include storage devices 252A-252Z, which can be provided by physical storage devices. Storage system 250 can include a storage system controller 254. Physical storage devices of storage system 250 can include associated controllers. Storage devices 252A-252Z can be provided, e.g. by hard disks and Solid-State Storage Devices (SSDs). Storage system 250 can be in communication with certain ones of computing nodes 10 of core computing environment 200 by a Storage Area Network (SAN) and/or a Network Attached Storage (NAS) link. According to one embodiment, core computing environment 200 can include fibre channel network providing communication between certain ones of computing nodes 10 of core computing environment (such as the computing node 10 hosting VM 220) and storage system 250. The fibre channel network can include a physical fibre channel that runs the fibre channel protocol to define a SAN. NAS access to storage system 250 can be provided by an IP based network with core computing environment 200. Among other functions, authority 215 can manage the instantiation of virtual machines (VMs) on computing nodes 10 of core computing environment 200 and virtual networks (VNs) defined by computing nodes 10 of core computing environment 200.

Edge computing environments 100A-100Z can be configured according to edge computing environment 100A. Edge computing environment 100A can include computing nodes of a RAN, computing nodes of a content delivery network (CDN) and/or computing nodes of a CN. Where edge computing environment 100A is provided by a RAN, computing nodes 10 of edge computing environment 100A can be provided by RAN compute nodes.

Edge computing environment 100A can include storage system 150 having storage devices 152A-152Z. Storage system 150 can include a storage system controller 154. Storage system 150 is shown as a shared storage system shared by certain ones of computing nodes 10 of edge computing environment 100A, but computing nodes 10 can alternatively have dedicated storage. Computing nodes 10 can be provided by physical computing nodes. Storage system 150 can include storage devices 152A-152Z, which can be provided by physical storage devices. Physical storage devices of storage system 150 can include associated controllers. Storage devices 152A-152Z can be provided, e.g. by hard disks and Solid-State Storage Devices (SSDs). Storage system 150 can be in communication with certain ones of computing nodes 10 of edge computing environment 100A by a Storage Area Network (SAN) and/or a Network Attached Storage (NAS) link. According to one embodiment, edge computing environment 100 can include a fibre channel network providing communication between certain ones of computing nodes 10 of edge computing environment 100A (such as the computing node 10 that hosts VM 220 in edge computing environment 100A) and storage system 150. The fibre channel network can include a physical fibre channel that runs the fibre channel protocol to define a SAN. NAS access to storage system 150 can be provided by an IP based network within core computing environment 200. Among other functions, authority 115 can manage the instantiation of virtual machines (VMs) on computing nodes 10 of edge computing environment 100A and virtual networks (VNs) defined by computing nodes 10 of edge computing environment 100A.

According to one embodiment, each of storage system 250 and storage system 150 can define tiers of storage. Tiered storage is an underlined principle of information lifecycle management (ILM). Tiered storage is a storage networking method where data is stored on various types of storage volumes based on performance availability and recovery requirements. In one embodiment, Tier 0 storage can be used for mission critical files. Tier 0 storage devices can be provided by SSDs which can be faster than Tier 1 storage devices, which can be faster than Tier 2 storage devices, which can be faster than Tier 3 storage devices. According to one embodiment, VM 220 (edge instance) can be configured so that when accessing data from storage system 250 or storage system 150, VM 220 (edge instance) can search for data in an order determined by the location of the storage system and the storage tiering. That is, when accessing data from a storage system, VM 220 can search for asset data in an order of storage system 150 local to VM 220 (edge instance) and then storage system 250 external and remote from VM 220 (edge instance). When accessing data from storage system 150, VM 220 (edge instance) can search according to an order of Tier 0, then Tier 1, then Tier 2, then Tier 3. When accessing data from storage system 250, VM 220 (edge instance) can search according to an order of Tier 0, then Tier 1, then Tier 2 then Tier 3.

In a further aspect, system 1000 can include social media system 500. Social media system 500 can include a collection of files, including for example, HTML files, CSS files, image files, and JavaScript files. Social media system 500 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider, or an email delivery system. During a process of registration wherein a user of system 1000 registers as a registered user of system 1000, a user sending registration data can send with permission data defining the registration data a permission that grants access by system 1000 to data of the user within social media system 500. On being registered, system 1000 in the support of media streaming session can examine data of social media system 500 e.g. to determine whether first and second users are in communication with one another via a messaging system of social media system 500. A user can enter registration data using a user interface displayed on a client computer device of a UE device 10A-10Z. Entered registration data can include e.g. name, address, social media account information, other contact information, biographical information, background information, preferences information, and/or permissions data e.g. can include permissions data allowing system 1000 to query data of a social media account of a user provided by social media system 500 including messaging system data and any other data of the user such as posts data of the user. When a user opts-in to register into system 1000 and grants system 1000 permission to access data of social media system 500, system 1000 can inform the user as to what data is collected and why, that any collected personal data may be encrypted, that the user can opt out at any time, and that if the user opts out, any personal data of the user is deleted.

According to one embodiment, VM 220 (core instance and edge instance) can be defined by a guest OS and media streaming application 230 which runs various processes. Media streaming application 230 can run hosting decision process 231, slice selection process 232, multiple stream media streaming process 233, speech-to-text process 234, natural language processing (NLP) process 235, image recognition process 236, stream examination and decision process 237, and coordination process 238. VM 220 (core instance) can run on hypervisor 210 which can run on computing node 10 of core computing environment 200 which can be provided by a physical computing node. VM 220 (edge instance) can run on hypervisor 110 which can run on computing node 10 of edge computing environment 100A which can be provided by a physical computing node. VM 220 (core instance and/or edge instance) shown as being provided by a hypervisor based virtual machine, can alternatively be provided by a container based virtual machine. VMs herein such as VM 220 (core instance) and VM 220 (edge instance) can define virtual computing nodes. Computing nodes 10 herein can define physical computing nodes.

Media streaming application 230 can be in communication with data repository 240 which is depicted in logical schematic view form which can be physically located within storage system 250 and/or storage system 150. Data repository 240 can include users area 241 for storage of data on users of system 1000, sessions area 242 for storage of data on historical media streaming sessions hosted by system 1000, models area 243 for storing predictive models, and decision data structure area 244 for storing decision data structures for use by VM 220 and return of action decision.

Media streaming application 230 running hosting decision process 231 can determine whether media streaming application 230 should be migrated to edge computing environment 100A for servicing the user in a requested session. Media streaming application 230 running slice selection process 232 can return action decisions for the generation of slice selection data. Slice selection data can include slice selection data for adjusting parameter values of a slice or for selection of a new slice. Media streaming application 230 running multiple stream streaming process 233 can perform simultaneous streaming of multiple media streams over one or more network slice configured for persistent delivery of specified key performance indicators (KPIs) defined by slice parameter values specified for the network slice. Media streaming application 230 running speech-to-text process 234 can subject respective streams that are streamed in a multiple stream streaming process to speech-to-text processing to convert speech data into text data.

Media streaming application 230 running NLP process 235 can extract NLP output tags for association to media streams being streamed. VM 220 can run NLP process 235 to process data for preparation of records that are stored in data repository 112 and for other purposes. Media streaming application 230 can run NLP process 235 for determining one or more NLP output parameter of a message. NLP process 235 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter. By running of NLP process 235 VM 220 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." VM 220 running NLP process 235 can include VM 220 returning NLP output parameters in addition to those specification topic and sentiment, e.g. can provide sentence segmentation tags, and part of speech tags. VM 220 can use sentence segmentation parameters to determine e.g. that an action topic and an entity topic are referenced in a common sentence for example. VM 220 can ascertain that a user has a positive preference for certain topic by extraction of a positive sentiment from text strings from which the certain topic was extracted.

Media streaming application 230 running image recognition process 236 can examine spatial image data representing a feature of interest can include VM 220 employing pattern recognition processing using one or more of e.g. feature extraction algorithms, classification algorithms, and/or clustering algorithms. In one embodiment, VM 220 running image recognition process 236 can include performing of digital image processing. Digital image processing can include, e.g., filtering, edge detection, shape classification, optical character recognition (OCR), and/or encoded information decoding.

Media streaming application 230 running stream examination and decision process 237 can examine extracted topic tags extracted from media streams that are being streamed and can identify matches between topics associated to media streams being simultaneously transmitted to a user.

Media streaming application 230 running coordination process 238 can manage coordinated messaging between core and edge VMs after handing off of a media streaming session for hosting by an edge VM.

Embodiments herein recognize that streaming of multiple media streams can result desynchronization of the media streams. For example, with streaming of first and second different media streams, the first and second different media streams can exhibit different times of delivery to a user at a UE device. Embodiments herein can include simultaneous transmission of multimedia streams over one or more persistent KPI delivering network slice for facilitation of timing synchronization between the multiple media streams. Embodiments herein can include data extraction from multiple media streams at a sending end, examining of the extracted data, and providing feedback to user based on the examining.

VM 220 (edge instance) and VM 220 (core instance) can be in communication with network slice management function (NSMF) 260, which NSMF 260 can have an associated slice registry 270. NSMF 260 can be run on a computing node 10 of core computing environment 200 and/or edge computing environment 120A. Slice registry 270 can store data on network slices of system 1000. Network slicing refers to a network architecture for enabling multiplexing of virtualized and independent logical networks on a common physical network infrastructure. Each network slice can be provided as an end-to-end virtual network (VN) tailored to fulfill diverse requirements requested by a certain application. A network slice can refer to elements of the network configured for the provisioning of a certain type of service. There can be different requirements on functionality (e.g., priority, policy control), differences in performance requirements (e.g., bandwidth, user plane latency, reliability, availability, packet loss ratio, security and other slice parameters), or they can serve only specific types of users. The different slices can be used simultaneously. Bandwidth can be expressed in terms of e.g. Hz and/or bits/s.

Network slicing can use software defined networking (SDN) and network function virtualization (NFV) so that a network slice is configured to deliver specified key performance indicators (KPIs) defined by slice parameter values for the network slice persistently (continually) over time. Management and Orchestration (MANO) featurization of system 1000 can be in accordance the following specifications published by the European Telecommunications Standards Institute (ETSI): ETSI GSNFV-SOL001, ETSI GSNFV-SOL002, ETSI GSNFV-SOL003, ETSI GSNFV- SOL004, ETSI GSNFV-SOL005, ETSI GSNFV-SOL006, ETSI GSNFV-SOL007, and ETSI GSNFV-SOL013. Management and Orchestration (MANO) featurization of system 1000 can also be in accordance with the documents of 3GPP TS 28.530 V15.1.0 Release 15 by the 3$^{rd}$ Generation Partnership Project (3GPP) and the technical reports of Release 16 of the 3GPP (3GPP Release 16 reports). According to one embodiment, Single-Network Slice Selection Assistance Information (S-NSSAI) can be used to provide a network slice identifier for identification of a network slice. NSSAI refers to a collection of S-NSSAI (Single—Network Slice Selection Assistance Information) values which can be sent to the network by a UE device to assist a network in selecting a particular Network Slice. Usage of network slice identifiers for network slice participation management can be performed according to the documents of Release 15 of the 3$^{rd}$ Generation Partnership Project (3GPP) (3GPP Release 15 documents) and the technical reports of Release 16 of the 3GPP (3GPP Release 16 reports). The NSSAI (Network Slice Selection Assistance Information) is a collection of S-NSSAIs. Multiple S-NSSAIs defining NSSAI can be sent in signalling messages between a UE device and a network. A single UE device can be served by multiple network slices at a time. The S-NSSAI signalled by a UE device to the network, assists the network in selecting a particular network. A network slice instance can refer to set of network function instances and the required resources (e.g. compute, storage and networking resources) which form a deployed network slice. A network slice herein can be provided by a paired network slice characterized by a first slice of a first domain being paired to a second slice of a second domain, and in some cases one or more additional domain specific slice.

Figure 4B:
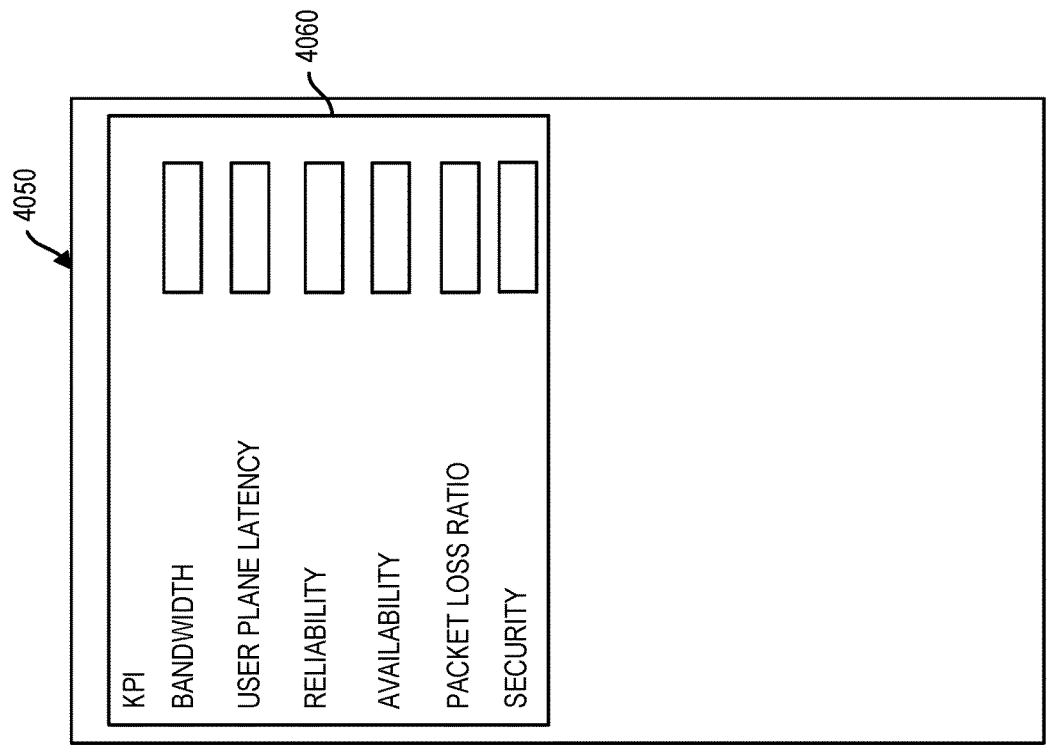
FIG. 4B is a user interface for display on a display of an operator user computing node based device according to one embodiment.

Slice registry 270 can store data on a current status of a plurality of slices. Status data of a slice can include, e.g. in preparation, active and reserved, active and available, or inactive. Slice specification parameters can be associated with each slice specified in slice registry 270. Slice specification parameter can include, e.g. bandwidth (e.g. in bits/s), user plane latency, reliability, availability, packet loss ratio, security and other slice parameters. Minimum and maximum values can be specified for each slice. An operator of an entity providing a service can use a user interface to define requirements for new slices or to define parameter value sets for new slices or system 1000 can generate specification data for new slices autonomously. System 1000 can be configured to permit an operator user to update slice registry 270 to include new network slices with use of displayed user interface 4050 as shown in FIG. 4B having area 4060 to permit an operator user to specify slice parameter values. Slice parameter values that can be specified can include e.g. a bandwidth parameter value (e.g. in bits/s), user plane latency parameter value, a reliability parameter value, an availability parameter value, a packet loss ratio parameter value, a security parameter value. On receipt of an order for a new slice by an operator user, NSMF 260 can send a request to control plane orchestrator 400 to instantiate the new slice.

In addition to storing data on network slices of system 1000, NSMF 260 can respond to requests for instantiation of new slices. A request for instantiation of a new slice can include parameter value specification data for a slice. In response to receipt of a request for a new slice, NSMF 260 can forward the request to control plane orchestrator 400. Control plane orchestrator 400 for instantiation of a slice can assign a slice identifier to the slice and can return the slice identifier to NSMF 260, which in turn can distribute the slice identifier to participating nodes participating in a network slice. Control plane orchestrator 400 can be provided by one or more entity. Control plane orchestrator 400 can be responsible for communicating with computing nodes of core computing environment 200 and edge computing environment 100A so that an instantiated slice is configured for persistent delivery of specified KPIs in accordance with specified slice parameter values that are specified in a slice instantiation request. Table A below depicts data of slice registry 270, according to one embodiment. Slice identifiers according to one embodiment can be assigned in accordance with NSSAI functionality described in 3GPP TS 38.300 version 15.3.1 Release 15 by the 3$^{rd}$ Generation Partnership Project (3GPP) and 3GPP TS 28.530 V15.1.0 Release 15 (3GPP).

TABLE A

| Slice | Status | Parameter Values | ... |
|---|---|---|---|
| ... | ... | ... | ... |
| S101 | Active, Reserved | XX; XX; XX; XX; XX | ... |
| S102 | Active, Available | XX; XX; XX; XX; XX | ... |
| S103 | Inactive | XX; XX; XX; XX; XX | ... |
| S104 | Prepared | XX; XX; XX; XX; XX | ... |
| S105 | Active, Available | XX; XX; XX; XX; XX | ... |

Figure 2A:
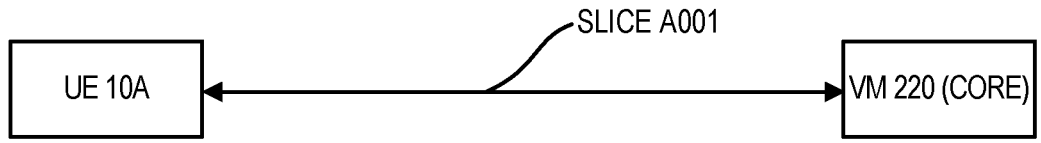
FIGS. 2A-2E are diagrams depicting network slice profiles for support of media streaming operations according to various embodiments.
Figure 2B:
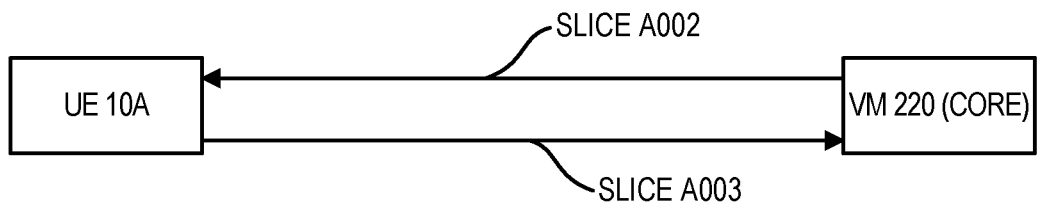
Figure 2C:
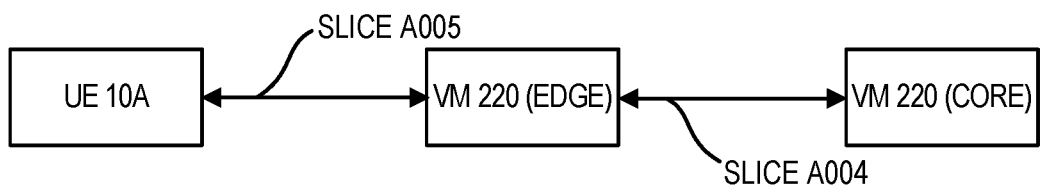
Figure 2D:
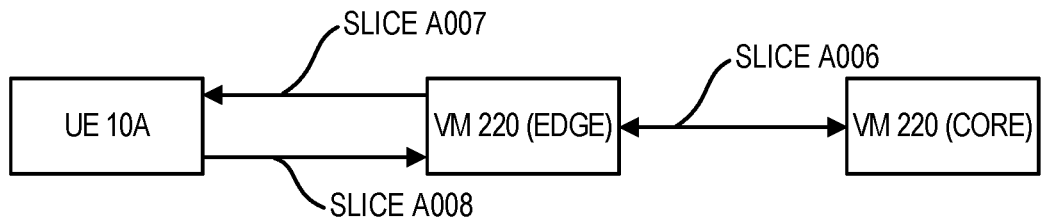
Figure 2E:
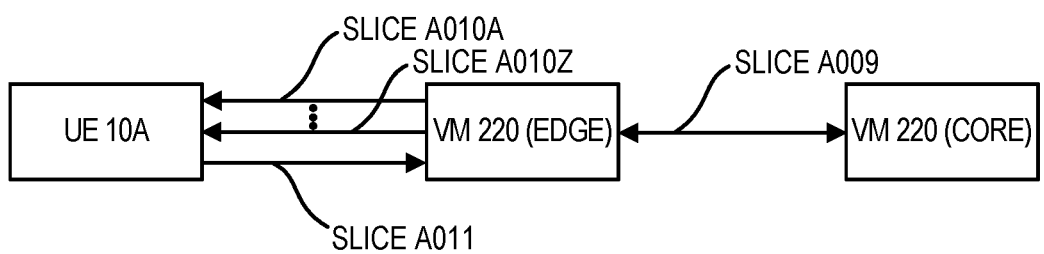

System 1000 can be configured to select one or more network slice for accommodation of data traffic of a media streaming session. Various network slices can be specified for support of a media streaming session as are described generically in FIGS. 2A-2E. FIG. 2A depicts a bidirectional network slice for support of communications between VM 220 core and UE device 10A (for the scenario where media streaming functions are performed in VM 220 core). FIG. 2B depicts a first network slice selected for core to UE device 10A media streams and a second network slice for transmission of user data from UE device 10A to VM 220 (core instance). Embodiments herein recognize that transmitting user data using a network slice separate from the network slice specified for media streaming can improve performance of media streaming operations. Referring to the embodiment of FIG. 2C, system 1000 can establish a first network slice for bidirectional communications between VM 220 (core instance) and VM 220 (edge instance) and a second bidirectional network slice for bidirectional communications between VM 220 (edge instance) and UE device 10A. Referring to FIG. 2D a first bidirectional network slice can be established for facilitating bidirectional communications between VM 220 (core instance) and VM 220 (edge instance), a second network slice can be established for facilitating unidirectional media streaming from VM 220 to UE device 10A, and a third network slice can be established for facilitating uplink communications data traffic from UE device 10A to VM 220 (edge instance). Referring to FIG. 2E, a first network slice can be selected for support of bidirectional communications between VM 220 (core instance) and VM 220 (edge instance) and in the embodiment of FIG. 2E, a dedicated network slice can be selected for facilitating transmission of each media stream selected by a user. That is, referring to FIG. 2E network slice A010A can be used for streaming of a first media stream, network slice A010B can be used for streaming of a second media stream, and so on, so that each media stream that is streamed by VM 220 (edge instance) is transmitted using a single specified network slice of network slices A010A-A010Z selected for use in transmitting that media stream. Further referring to the embodiment of FIG. 2E, a particular network slice A011 can be selected for facilitating uplink traffic from UE device 10A to VM 220 (edge instance).

System 1000 by operation of NSMF 260 and control plane orchestrator 400 can maintain end-to-end path information for each instantiated network slice. Network slices herein can include single domain slices and paired slices that are stitched between domains. On instantiation of a network slice, control plane orchestrator 400 can dynamically manage the sub virtual layer configuration of edge computing environment 100A and/or core computing environment 200 so that the network slice is configured or persistent delivery of specified KPIs defined for the network slice by specified network slice parameter values. Control plane orchestrator 400 can control software defined networking (SDN) functionality and network function virtualization (NFV) functionality of edge computing environment 100A and/or core computing environment 200 so that the network slice is configured or persistent delivery of specified KPIs specified for the network slice as defined by slice parameter values for the network slice.

Figure 3:
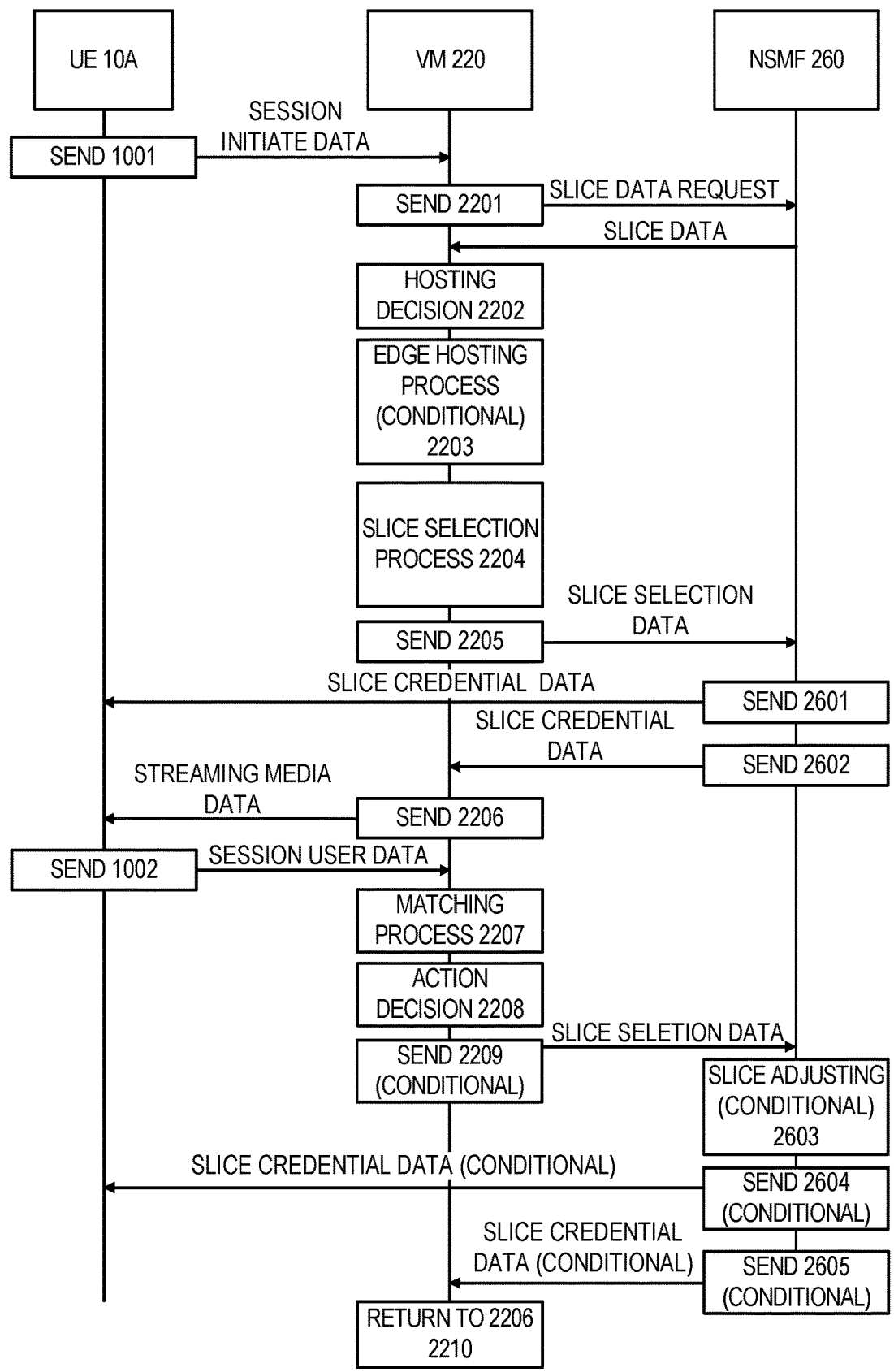
FIG. 3 is a flowchart depicting a method for performance by a computing node interoperating with other computing nodes according to one embodiment.

Additional features are described with reference to FIG. 3 showing VM 220 interoperating with UE device 10A and NSMF. Prior to performance of block 1001 depicted in the flowchart of FIG. 3 a user of UE device 10A can register to receive services provided by system 1000. VM 220 can store received registration data into users area 241 on receipt of the registration data. Registration data of a user can include registration data that is input into user interface 4000 as described in FIG. 4. User interface 4000 can be a displayed user interface for display on a display of a UE device such as UE device 10A. A user can enter in contacts area 4010 contact information, e.g. name, address, social media account data, email address and the like. The user can enter into permissions area 4020 permissions by a user to grant to system 1000 permission to use user data. Permissions data can include e.g. permissions to use social media account data of a user, e.g. social media posts data, social media messaging data, and the like. Permissions data can also include permissions to extract data from a UE device 10A of a user. Such data can include, e.g. calendar data or location data of a user. User interface 4000 can include preferences area 4030 which permits a user to define preferences of the user. Preferences area 4030, in one embodiment, can present to user survey data which prompts a user to answer survey questions. Based on the survey question, system 1000 can gain an understanding of the user's preferences. Preferences data entered into preferences area 4030 can be stored with permissions data into users area 241 of data repository 240. On completion of registration, VM 220 can send an installation package for receipt and installation on UE device 10A. The installation package can include e.g. libraries and executable code that facilitate the participation of UE device 10A and system 1000. Functionality provided by the installation package can include e.g. functionality to permit UE device 10A to simultaneously receive multiple streams of media data and to selectively display selective one or more stream of the received media streams. The described media player functionality can also include featurization to allow a user to enter user interface inputs into a media playing user interface for display on a user interface with playback media streams textual based prompting content to a user. After registration of a user associated to UE device 10A and installing an installation package on UE device 10A, VM 220 can wait for a media viewing session to be initiated by a user of UE device 10A.

At block 1001, UE device 10A can be sending session initiate data for receipt by VM 220 which session can be initiated with the sending of the session initiate data. The session initiate data sent at block 1001, according to one embodiment, can be received by an instance of VM 220 instantiated in core computing environment 200. Session initiate data can include specified media streams that have been specified by a user for playback on UE device 10A. System 1000 can be configured so that the session initiate data sent at block 1001 is sent in response, e.g. to opening of an application on UE device 10A or power-up of a playback device defined by UE device 10A. System 1000 can be configured to permit a user of UE device 10A to specify N media streams to be simultaneously received and selectively played on UE device 10A.

In response to receipt of the session initiate data sent at block 1001, VM 220 can request slice data from NSMF 260. NSMF 260 can send slice data in response to a request for slice data received from VM 220 at block 2201. The slice data can include data on slices of system 1000, including data on which slices are currently active and available and the domains through which the slices span, e.g. between a RAN only and a CN only, and can specify slice parameter values associated to each slice. In response to receipt of the slice data requested at block 2201, VM 220 can proceed to block 2202.

At block 2202, VM 220 can perform a hosting decision to determine whether VM 220 can be hosted at core computing environment 200, where it is currently instantiated. For performance of block 2202, VM 220 (by core instance) can examine media data specified in the session initiate data sent at block 1001 and can also examine the slice data requested at block 2201. VM 220 at block 2202 can determine whether there is an active and available slice available within system 1000 configured for support of a streaming media stream in accordance with the session initiate data. Embodiments herein recognize that slices for supporting UE device traffic having threshold exceeding bandwidth parameter values may more readily be instantiated where they are specified to have an endpoint in an edge computing environment than where they are specified to have an endpoint in a core computing environment. Embodiments herein recognize that a slice having threshold exceeding bandwidth can more readily be instantiated in the case that the slice has a first endpoint at UE device 10A and a second endpoint within edge computing environment 100A, than in the case where the slice has a first endpoint at UE device 10A and a second endpoint within core computing environment 200. Thus, scenarios are envisioned where slice registry 270 specifies an active and available slice for support of streaming media functioning of an edge computing node that does not specify slices having parameter values for supporting streaming functions of a computing node disposed in core computing environment 200. Embodiments herein also envision that various use cases, particularly where streaming media requested by user is sufficiently lightweight that streaming functions by computing node in core computing environment 200 can adequately be supported by a wide range of active and available slices specified in slice registry 270 and specified slice domains that specify slice availability within a core computing environment 200 (end-to-end slice from UE device 10A to core computing environment 200).

At hosting decision block 2202, VM 220 (core instance) can return an action decision to run media streaming functions from VM 220 (core instance) in the case that an active and available slice is identified within slice registry 270. At hosting decision block 2202, VM 220 (core instance) can determine that streaming functions are to be performed by VM 220 (edge instance) in the case that slice registry 270 does not specify a UE device 10A to core slice suitable for support of the current stream request specified in the session request data sent at block 1001. In the case that VM 220 (core instance) determines that hosting of a current media stream is to be performed by a computing node within edge computing environment 100A, VM 220 can proceed to block 2203 to perform an edge hosting process.

For performing edge hosting process block 2203, VM 220 can first ascertain whether there is an existing VM in location proximity to UE device 10A capable of satisfying the current streaming media request. When such pre-existing VM is identified, VM 220 can transfer state and data of VM 220 (core instance) to VM 220 (edge instance). In the case that no VM within edge computing environment 100A identified VM 220 (core instance) at block 2203 can perform messaging to instantiate a new VM within edge computing environment 100A for support of streaming functions and satisfaction session of the media data specified in the session initiate data sent at block 1001. Messaging can include appropriate messaging to authority 215 associated to core computing environment 200 and/or authority 115 associated to edge computing environment 100A. For the instantiation of VM 220 (depicted in dashed form) on hypervisor 110 of edge computing environment 100A, which hypervisor 110 can run on computing node 10 provided by physical computing node. Depicted by hypervisor based virtual machine, VM 220 (edge instance) can alternatively be provided by container based virtual machine. Where VM 220 (edge instance) is provided by a new VM instantiated within edge computing environment 100A, state and data from VM 220 (core instance) can be transferred to the newly instantiated VM 220 (edge instance). Computing node 10 of edge computing environment 100A in which hypervisor 110 runs can be a physical computing node provided, e.g. by compute node of a RAN or an edge server of a content delivery network (CDN). After instantiation of VM 220 (edge instance), VM 220 (core instance) can remain functional for support of media streaming operations by VM 220 (edge instance). For example, VM 220 (core instance) can be a centralized node configured to receive media streams of live entertainment events, e.g. live sporting events, live television broadcasts, and the like. VM 220 (core instance) can have associated therewith storage system 250 available for access by a plurality of instances of VM 220 (edge instance). Storage system 250 can serve as a media library and VM 220 in combination with storage system 250 can serve as an origin server for serving content to a plurality of edge servers defined within different edge computing environments of edge computing environments 100A-100Z. On instantiation of VM 220 (edge instance) VM 220 (core instance) can push asset data for support of a user's media stream request to storage system 150 of edge computing environment 100A, which storage system 150 can be local to VM 220 (edge instance) for fast access by VM 220 (edge instance). On performance of block 2203, VM 220 can proceed to block 2204.

At block 2204, VM 220 can perform slice selection process to select network slices for facilitating a media streaming session. Referring to FIGS. 2A-2E various network slices are described in generical form that can be specified for support of a media streaming session. FIG. 2A depicts a bidirectional slice for support of communications between VM 220 core and UE device 10A (for the scenario where media streaming functions are performed in VM 220 core). FIG. 2B depicts a first slice selected for core to UE device 10A media streams and a second slice for transmission of user data from UE device 10A to VM 220 (core instance). Embodiments herein recognize that transmitting user data using a network slice separate from the network slice specified for media streaming can improve performance of media streaming operations. Referring to the embodiment of FIG. 2C, system 1000 can establish a first slice for bidirectional communications between VM 220 (core instance) and VM 220 (edge instance) and a second bidirectional slice for bidirectional communications between VM 220 (edge instance) and UE device 10A. Referring to FIG. 2D a first bidirectional slice can be established for facilitating bidirectional communications between VM 220 (core instance) and VM 220 (edge instance), a second slice can be established for facilitating unidirectional media streaming from VM 220 to UE device 10A, and a third slice can be established for facilitating uplink communications data traffic from UE device 10A to VM 220 (edge instance). Referring to FIG. 2E, a first slice can be selected for support of bidirectional communications between VM 220 (core instance) and VM 220 (edge instance) and in the embodiment of FIG. 2E, a dedicated slice can be selected for facilitating transmission of each media stream selected by a user. That is, referring to FIG. 2E slice A010A can be used for streaming of a first media stream, slice A010B can be used for streaming of a second media stream, slice A010C can be used for streaming of a third media stream, and so on, so that each media stream that is streamed by VM 220 (edge instance) is transmitted using a single specified network slice selected for use in transmitting that media stream. Further referring to the embodiment of FIG. 2E, a particular slice generically specified as slice A011 can be selected for facilitating uplink traffic from UE device 10A to VM 220 (edge instance). Embodiments herein recognize that transmitting first and second different media streams over first and second different network slices can reduce unexpected latency variations between streams and can improve synchronization between streams.

Figure 1B:
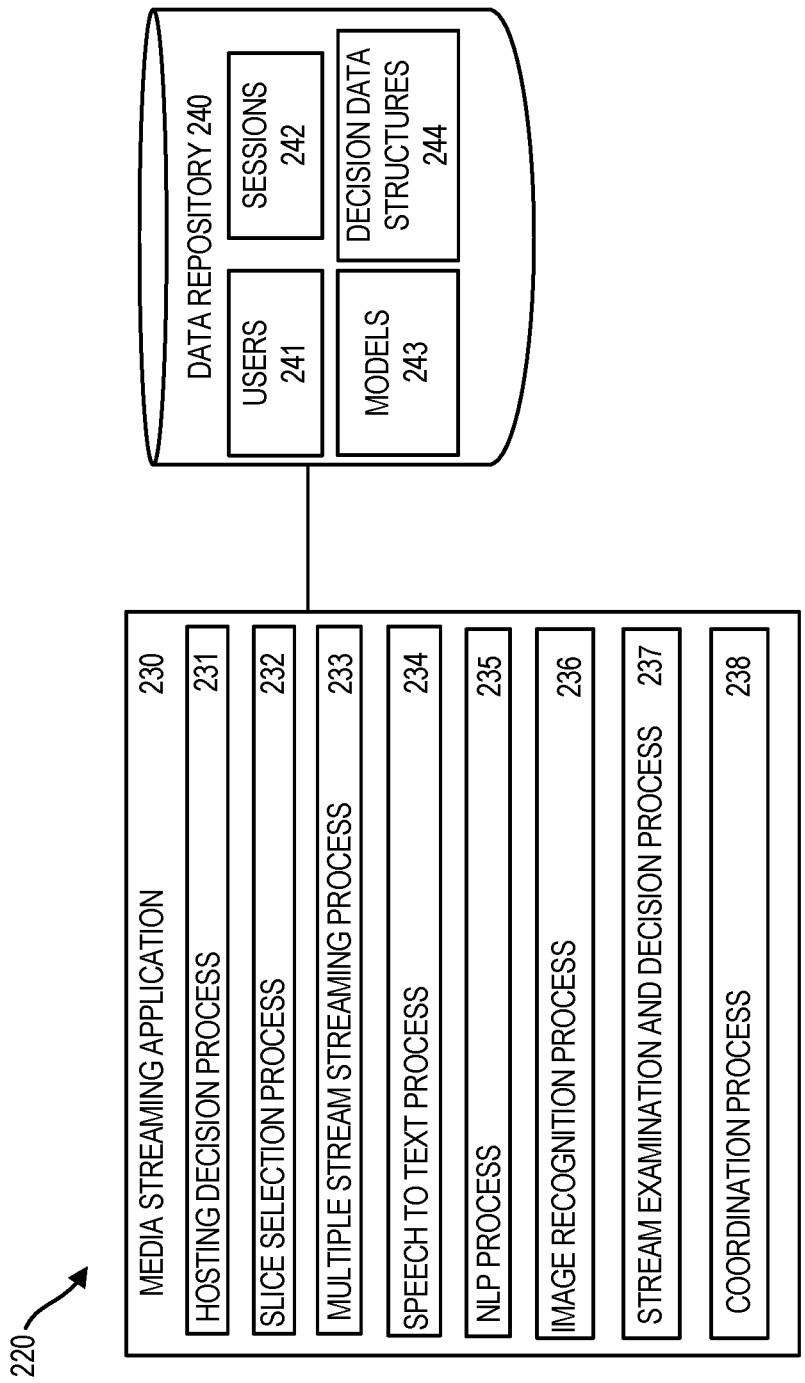
FIG. 1B is a schematic diagram depicting processes for performance by a computing node according to one embodiment.

Referring to FIG. 1B, VM 220 (core instance) can perform the same processes as VM 220 (edge instance), except with respect to coordination process 237. After hand off of media streaming functions to VM 220 (edge instance), processes 232-237 remain inactive on VM 220 (core instance), except that coordination process 237 of VM 220 (core instance) remains active to coordinate asset data pulls by VM 220 (edge instance) from storage system 250 to storage system 150 local to VM 220 (edge instance). After handoff of media streaming functions to VM 220 (edge instance) processes 232-237 on VM 220 (edge instance) can be active and coordination process 237 of VM 220 (edge instance) can be responsible for pulling asset data from storage system 250 for storage caching into storage system 150 local to VM 220 (edge instance).

VM 220 performing slice selection process block 2204 (by the core instance or the edge instance wherever media streaming is being hosted) can examine slice data received in response to the slice data request of block 2201 to determine whether there are active and available network slices specified within slice registry 270 suitable for supporting the streaming operations of a streaming media request specified in the session initiate data sent at block 1001. For performance of block 2204, VM 220 can examine contents of a streaming media data table that can store decision data structures area 244 of data repository 240. A streaming media table can be provided as set forth in Table B below.

TABLE B

| Row | Steaming media type | Ratings values |
|---|---|---|
| 1 | M001 | XX; XX; XX; XX |
| 2 | M002 | XX; XX; XX; XX |
| 3 | M003 | XX; XX; XX; XX |
| ... | ... | ... |

Referring to Table B various ratings values including bandwidth ratings values can be assigned to various media types. VM 220 can examine data of the streaming media Table B in connection with slice data received in response to the request at block 2201 to identify any active and available slices capable of supporting the selected media stream of a user. Based on the described processing, VM 220 can select a slice for support of a media stream that is streamed from VM 220 (core or edge) to UE device 10A. For selection of a slice to accommodate multiple streams, VM 220 at block 2204 can aggregate ratings values associated to multiple streams of a user specified multiple stream transmission. VM 220 can select additional slices such as species slices of any of the generical network slices described in connection with FIG. 2A-2E. Slice selection data sent at block 2205 can include, e.g., slice selection data for selection of slice to support data communications between VM 220 (core instance) and VM 220 (edge instance) during a media streaming session. Such slice selection can be performed based on expected requirements for data asset delivery from storage system 250 to storage system 150 for performance of a media session. VM 220 can perform such selection by examination of session initiate data sent at block 1001 in connection with media data specified in Table B.

For performing simultaneous streaming of multiple streams, VM 220 can perform streaming operations in accordance with the Realtime Transport Protocol (RTP) as set forth in Request for Comments (RFC) 8108 entitled "Sending Multiple RTP Streams in a Single RTP Session, which updates RFC 3550 and RFC 4585. According to one embodiment, VM 220 performing block 2204 can include VM 220 querying a predictive model that has been trained using machine learning processes to predict the performance of a candidate slice in streaming a multiple stream transmission. Streaming can include methods in accordance with Real Time Streaming Protocol (RTSP) set forth in in Request for Comments (RFC) 2326 and in accordance with RTSP 2.0 as described in RFC 7826.

Referring to FIG. 6A, predictive model 6002 can be trained with use of iteratively applied training datasets. Each training dataset can include streaming media profile associated to a synchronization score. The streaming media profile of an applied training dataset can specify the streaming media profile of each training dataset can specify media types of the respective media streams defining a media transmission session and the number of streams. The specified media stream type can include an associated encoding scheme. Each training dataset having streaming media profile can be accompanied by a synchronization score, which specifies performance of the specified streaming media profile in terms of synchronization. Synchronization score for a streaming media transmission can be determined by examination of timestamped frames stamped with times at the transmission end.

System 1000 can instantiate an instance of predictive model 6002 for each of a plurality of candidate species network slices that are species network slices of the generical network slices described in FIGS. 2A-2E for accommodating data traffic from VM 220 to UE device 10A. VM 220 can query predictive model 6002 once it has been trained for return of a prediction of the candidate network slice in terms of synchronization performance. Predictive model 6002 once trained can be subject to query by query data that includes a current streaming media profile, e.g. at block 2204 streaming multimedia profile specified in the session initiate data sent at block 1001. At block 2204, VM 220 can query an instance of predictive model 6002 that is been instantiated for each candidate slice specified in slice registry 2270 identified as being active and available for facilitation of streaming media transmissions from VM 220 to UE device 10A. At block 2204, VM 220 can select the candidate slice having the highest synchronization performance score as determined by the query of multiple instances of predictive model 6002.

VM 220 can query predictive model 6004 for return of performance prediction data for network slices described in general form in FIGS. 2A-2E. Predictive model 6004 depicts a predictive model trained with use of iteratively applied training datasets, wherein the iteratively applied training datasets can include historical data of media streaming sessions participated in by all users of system 1000. Respective training datasets for training predictive model 6004 can include historical session data that includes (a) state and slice parameter value(s) for a certain session associated to (b) subsequent performance metrics data for the slice for the certain session. Performance metrics data can include average packet loss rate metrics data. A state of a session can be defined by a time period of a session in association with a current media stream selection of a user. System 1000 can train different instances of predictive model 6004 for each species slice of a generical slice described generically in reference to FIGS. 2A-2E. Predictive model 6004 with applied training data is able to understand how a particularly configured slice is expected to perform during a media streaming session after a particular state is reached. Thus, predictive model 6004 can be trained to learn of states that can trigger changes in slice requirements. Predictive model 6004 once trained can respond to query data provided by a current state and current slice parameter value(s) with an output that specifies the predicted subsequent performance metrics of the current slice. The current slice parameter value(s) can refer the parameter value(s) characterizing each candidate slice referenced in slice registry 270 being evaluated.

In response to completion of slice selection process block 2204, VM 220 at block 2205 can send selection slice selection data to an NSMF 260. The slice selection data sent at block 2205 can specify the candidate slice specified as being active and available in the slice data received in response to the request sent at block 2201. In one scenario, the slice selection data sent at block 2205 can specify a slice not referenced as being of active and available in slice registry 270. For example, in one scenario, instances of predictive model 6002 queried at block 2204 can include candidate slices that are not referenced as being currently active and available in slice registry 270, e.g. can include slices that are active but reserved for slices that are in preparation, not allocated, or slices that are not been subject to preparation. Accordingly, in one scenario, slice selection data sent at block 2205 can include an identifier of the candidate slice to be subject to instantiation so that it can be activated and used in the providing of media streaming functions. According to one scenario, slice selection data sent at block 2205 can include a set of parameter values defining a slice, e.g. parameter values for peak data rate, user experience data rate, user plane latency, reliability, bandwidth, and/or security. In response to receipt of selection data defining a slice not currently instantiated NSMF 260 can transmit the parameter value set to control plane orchestrator 400. Control plane orchestrator 400, in turn, can send slice credential data to NSMF 260 including a slice identifier for the new slice. Control plane orchestrator 400 can further appropriately communicate with computing nodes of edge computing environment 100A or core computing environment 200 and/or edge computing environment 100A so that the parameter values specified by the received slice selection data are configured to be continually delivered by the newly instantiated slice by operation of NFV functionality and SDN functionality of computing nodes of core computing environment 200 and/or edge computing environment 100A. In response to the receipt of slice selection data by the sending at block 2205, NSMF 260 can proceed to blocks 2601 and 2602.

At blocks 2601 and 2602, NSMF 260, in response to receipt of slice selection data sent at block 2205, can send slice credential data to UE device 10A and VM 220. The slice credential data can include, e.g. a network slice identifier and/or addressing data to facilitated participation of UE device 10A and VM 220 in a selected one or more network slice selected for supporting operations of a media streaming session. Where handoff of VM 220 (edge instance) has been performed, the sending of slice credential data at block 2602 can include sending of slice credential data to VM 220 (core instance) and to VM 220 (edge instance). With UE device 10A and VM 220 configured to transmit data of selected network slices, VM 220 can proceed to block 2206 to initiate transmission of streaming media data to UE device 10A.

In some scenarios, the slice selection data sent at block 2205 can specify dedicated network slices for delivery of each respective media stream to be streamed from VM 220 to UE device 10A. Embodiments herein recognize that providing a separate network slice for delivery of each respective media stream can yield a reduction in latency variation between the streams, and improved synchronization between streams. According to one embodiment, UE device 10A can be configured to include multiple endpoints for simultaneous receipt of multiple media streams sent over different network slices.

Embodiments herein can include matching of a topic of a first media stream to matching of a topic of a second media stream. Embodiments herein recognize that if the first stream and the second stream are not synchronized in terms of the respective receipt times, a user may be unable to discern the significance of an output that is provided in response to a user perceivable output that is provided in response to the matching. Without synchronization of the delivery of media streams, VM 220 can identify a match between topics of first and second media streams at VM 220, but the user viewing the first and second media streams at UE device 10A and viewing the second media stream desynchronized in time with respect to the first media stream.

In response to selection of one or more network slice to support the current media streaming session at block 2204, VM 220 can proceed to block 2206. At block 2206, VM 220 can send streaming media data for receipt and presentment by UE device 10A. VM 220 streaming media data at block 2206 can include VM 220 simultaneously streaming multiple media streams. According to one embodiment, the multiple media streams can include, e.g. live sports stream 1, live sports stream 2, news stream 1, news stream 2, movie stream 1, and movie stream 2. Streaming can be performed in compliance with the Real Time Streaming Protocol (RTSP) as described in Request for Comments (RFC) 2326 and in compliance with RTSP 2.0 as described in RFC 7826. VM 220 performing sending block 2206 can include VM 220 simultaneously sending multiple different media streams, e.g. simultaneously over one or more persistent KPI delivering network slice selected at block 2204. Commonly streaming the multiple media streams over a persistent KPI delivering one or more network slice can improve synchronization between streams.

VM 220 performing transmitting of streaming media data at block 2206 can include VM 220 simultaneously sending multiple streams to a common endpoint (an endpoint of UE device 10A) using processes described in RFC 8108 as referenced herein. According to one embodiment, the multiple streams can be sent over a common network slice selected at slice selection process block 2204 and in some use cases, the selected slice has been selected with use of a predictive model, which has been trained by machine learning processes to predict the performance of various candidate slices and transmitting selected multiple stream media streaming session specified by the session initiate data sent at block 1001. According to one scenario, the transmission of streaming media data at send block 2206 can include sending multiple different media streams with respective streams of the media streams being transmitted respectively with each respective media stream of the set of media streams being transmitted over a dedicated network slice selected to facilitate transmission of one stream.

In response to the receipt of streaming media data sent at block 2206, UE device 10A at block 1002 can send session user data for receipt by VM 220. The session user data sent at block 1002 can include in addition to an identifier of the user various sensor output data of one or more sensor disposed in UE device 10A. Sensor output data can be sensor output data, e.g. of a location sensor, e.g. a GPS device, health biometric sensor, and/or an environmental condition sensor, e.g. humidity, barometric pressure, or temperature sensor. In response to the receipt of session user data, VM 220 can perform matching process at block 2207. On receiving the sensor output data VM 220 can be updating user preferences stored in users area 241 of data repository 240. Thus, user preferences which can drive action decisions can be updated during a session.

For performing matching at block 2207, VM 220 can perform matching between a first media stream and each of second to Nth media streams. VM 220 performing matching at matching process block 2207 can include VM 220 extracting first audio data from a first media stream and second audio data from a second media stream. VM 220 can be iteratively extracting audio data from the first media stream and the second media stream and third to Nth media streams, where there are more than two streams. The first and second audio streams can be timestamped streams that are stamped with real time timestamps specifying the time of transmission of respective advancing time segments of the respective audio streams. According to one embodiment, a first audio stream of the first media stream can be timestamped with a succession of real time timestamps and the second audio stream of the second media stream can be stamped with a succession of real time timestamps, with each timestamp specifying a time of transmission of a particular time segment of audio data. VM 220 can perform the described real time timestamping. For performing of topic matching between audio streams, VM 220 can subject the extracted audio stream from a media stream to speech-to-text processing so that text is extracted from sampled audio stream extracted from media stream. On performing speech-to-text processing, VM 220 can stamp successive segments of text associated respectively to the first audio stream and the second audio stream in a manner so that the first text stream and, respectively, the second text stream associated to the second audio stream are stamped with real time timestamps that specify the timestamp of the audio stream segment from which the text was extracted. The first and second text streams provided, VM 220 at matching process block 2207 can subject the first text stream and the second text stream to NLP processing by activation of NLP process 235.

In addition to or in place of performing topic matching between streams using audio data processing, VM 220 can perform spatial image recognition processing for identification of topic matches between streams. VM 220 can extract first video data from a first stream and second video data from the second video stream. VM 220 can timestamp frames of the video data and second video stream to specify a time of transmission of the streams. VM 220 can perform spatial image recognition on the first video and the second video to extract topics from the first video data and the second video data. Extracted topics can include general topics or granular topics resolving to a keyword topic such as a particular person, place or thing. VM 220 can be running image recognition process to examine spatial image data representing a feature of interest can include VM 220 employing pattern recognition processing using one or more of e.g. feature extraction algorithms, classification algorithms, and/or clustering algorithms. In one embodiment, VM 220 running an image recognition process can include performing of digital image processing. Digital image processing can include, e.g., filtering, edge detection, shape classification, optical character recognition (OCR), and/or encoded information decoding.

Activation of NLP process 235 can result in extracted topics extracted from the first text stream and the second text stream, respectively. Topics, as set forth herein, which can be extracted by activation of NLP process 235 can be extracted so that general topics are extracted to describe multiple species or can be extracted granularly, e.g. resolving to a keyword topic that maps certain person, certain product, certain article, or certain thing. VM 220 performing matching process block 2207 can identify the topic match between a first media stream and a second media stream, when a topic extracted from the first media stream is identified as being in common with a topic extracted by processing the second media stream, i.e. the second text stream associated to the second audio stream associated to the second media stream. For identifying the matching of topics between a first media stream and a second media stream, VM 220 can impose the filter that a topic match is not identified unless the matched topic between the first text stream and the second text stream have associated real time timestamps that are within a specified time window, e.g. occur within 10 seconds of one another, five seconds of one another, one second of one another. Thus, when a user perceivable output is provided in response to match been identified the user is better able to perceive the meaning of the user perceivable output. On completion of matching process block 2207, VM 220 can proceed to block 2208 to perform an action decision at block 2208 based on the topic match. Topics can be extracted to define general topics such as mountain ranges or cities which encompass multiple species and/or can be extracted to define specific topics. Examples of general topics include mountain ranges and cities. Examples of species topics include the Himalayas and the Rockies for mountain ranges, and Chicago and New York for cities. According to one embodiment, a matching criterion applied by VM 220 for identification of a match can include the criterion that matching is based on identical topics being identified. In another embodiment, a matching criterion applied by VM 220 for identification of a match can include the criterion that matching is based on similar topics being identified. For example, topics can be plotted in a clustering algorithm scatterplot, and similar topics can be identified based on their having a Euclidian distance of within threshold distance.

At block 2208, VM 220 can return an action decision to identify one or more user perceivable output, perceivable by a user of UE device 10A in response to a match being identified. In some embodiments, an action decision returned at block 2208 can include an action decision to notify a user of UE device 10A as to the topic of interest to a user that has been identified by examination of streaming media data independent of any identified match being identified by VM 220.

For determining one or more user perceivable output to be presented to a user, VM 220 can apply a decision data structure, e.g. a decision data structure as set forth in Table C below, for the case that VM 220 identifies a matched stream.

TABLE C

| Row | Preference Level | Action |
| --- | --- | --- |
| 1 | $0.0 > P \le 0.3$ | None |
| 2 | $0.3 < P \le 0.6$ | send text based prompt notification |
| 3 | $0.6 < P \le 0.9$ | auto-present matched stream |
| 4 | $0.9 < P \le 1.0$ | auto-present matched stream; receive notices from other sessions |
| ... | ... | ... |

VM 220 performing action decision block 2208 can include VM 220 using decision data structure of Table C. In the decision data structure of Table C, action decisions can be selected based on an interest level of the user in the matched topic. The user's preference level (interest level) can be assigned a value of between 0.0 (lowest interest) and 1.0 (highest interest/preference). Where the user's preference level as to the matched topic is the level specified in Row 1, no action is taken. If the user's preference level is the preference level indicated in Row 2, the action decision can be the action decision to send a text based prompt notification to the user. If the user's preference level is the preference level indicated in Row 3, the action decision can be the action decision to auto-present a matched stream to the user. Where the user's preference level is the preference level of Row 4, the returned action decision can be the action decision to auto present the one or more matched stream as in the Row 3 action decision. Additionally, Row 4 can specify that a user can receive notifications of matches identified another media stream session being hosted by VM 220 with another one or more user. VM 220 can be configured to simultaneously host several media streaming sessions with different users. For example, VM 220 can be hosting a streaming session with a user of UE device 10B while hosting a streaming session with a user of UE device 10A. When Row 4 is triggered by a topic match of strong interest to a user being identified in a second media streaming session being hosted by VM 220, VM 220 can present a notification to the user of UE device 10A of the availability of the streams having matching content. The notification can include an active control which when selected by the user, results in a current media steam selection profile of the user of UE device 10A to be updates. In a variation of Row 4 the topic matched streams from a second session being hosted can be auto-presented on UE device 10A. The additional streams can impact slice selection data to result in adjusting of a current slice or selection of a new slice.

Table D illustrates a decision data structure for return of an action decision in the case the VM 220 identifies a topic of interest to a user.

TABLE D

| Row | Preference Level | Action |
| --- | --- | --- |
| 1 | $0.0 > P \leq 0.3$ | None |
| 2 | $0.3 < P \leq 0.6$ | send text based prompt notification |
| 3 | $0.6 < P \leq 0.9$ | auto-present stream |
| 4 | $0.9 < P \leq 1.0$ | auto-present stream; receive notices from other sessions |
| . . . | . . . | . . . |

In the decision data structure of Table D, action decisions can be selected based on an interest level of the user in the identified topic. The user's interest level can be assigned a value of between 0.0 (lowest interest) and 1.0 (highest interest/preference). Where the user's preference level as to the identifies topic is the level specified in Row 1, no action is taken. If the user's preference level is the preference level indicated in Row 2, the action decision can be the action decision to send a text based prompt notification to the user specifying that the stream having a topic of interest to a user is available. If the user's preference level is the preference level indicated in Row 3, the action decision can be the action decision to auto-present a stream to the user having the topic of interest to a user. The firing of Row 3 can result in the auto-presenting (auto-playing) of an identified stream if it is currently not playing. Where the user's preference level is the preference level of Row 4, the returned action decision can be the action decision to auto-present the one or more matched stream as in the Row 3 action decision. There is set forth herein transmitting, during a media streaming session, streaming media to a user equipment (UE) device of a user, the transmitting streaming media including transmitting a media stream to the UE device; subjecting the stream to processing; and providing one or more output in response to the processing. There is also set forth herein the method wherein the transmitting the media stream to the UE device is performed by a virtual machine (VM) running in an edge computing environment, wherein the method includes determining using data from the user equipment device obtained during the media streamlining session that a preference level of the user in a certain topic exceeds a threshold, examining a certain media stream transmitted by the VM to a second user equipment device to extract a particular topic from the certain media stream and providing the user a user interface control to playback the certain media stream in response to identifying a match between the certain topic and the particular topic.

Additionally, Row 4 can specify that a user can receive notifications of an identified stream from another media streaming session being hosted by VM 220 with another one or more user. VM 220 can be configured to simultaneously host several media streaming sessions with different users. For example, VM 220 can be hosting a streaming session with the user of UE device 10B while hosting a streaming session with a user of UE device 10A. When Row 4 is triggered by a topic of strong interest to a user being identified in a second media streaming session being hosted by VM 220, VM 220 can present a notification to the user of UE device 10A of the availability of the streams having matching content. The notification can include an active control which when selected by the user, results in a current media steam selection profile of the user of UE device 10A to be update. In variation of Row 4 the matching streams from a second session being hosted can be auto-presented on UE device 10A. The additional streams can impact slice selection data to result in adjusting of a current slice or selection of a new slice.

VM 220 can update the decision data structure of Table C and Table D over time with use of predictive model 6006 that can predict a user's response to a notification prompt. Training datasets for training predictive model 6006 can include (a) a matching notification to a user in association with (b) a user interface action of the user in response to the notification. The matching notification can specify a match between topics of different streams and/or can specify that a topic has been identified in a stream that matches a user preference. Trained as described, predictive model 6006 can predict a user's response to a notification. Predictive model 6006 on being trained can be responsive to query data which query data can include a current matching notification and predicted result. In some use cases, on examination of an output of predictive model 6006 VM 220 can predict with a threshold exceeding level of confidence that a user will actuate an active notification to play streams specified in a notification. In such user cases, VM 220 can update decision data structure of Table C and Table D to change a notification action decision to an auto-present action decision.

Figure 4A:
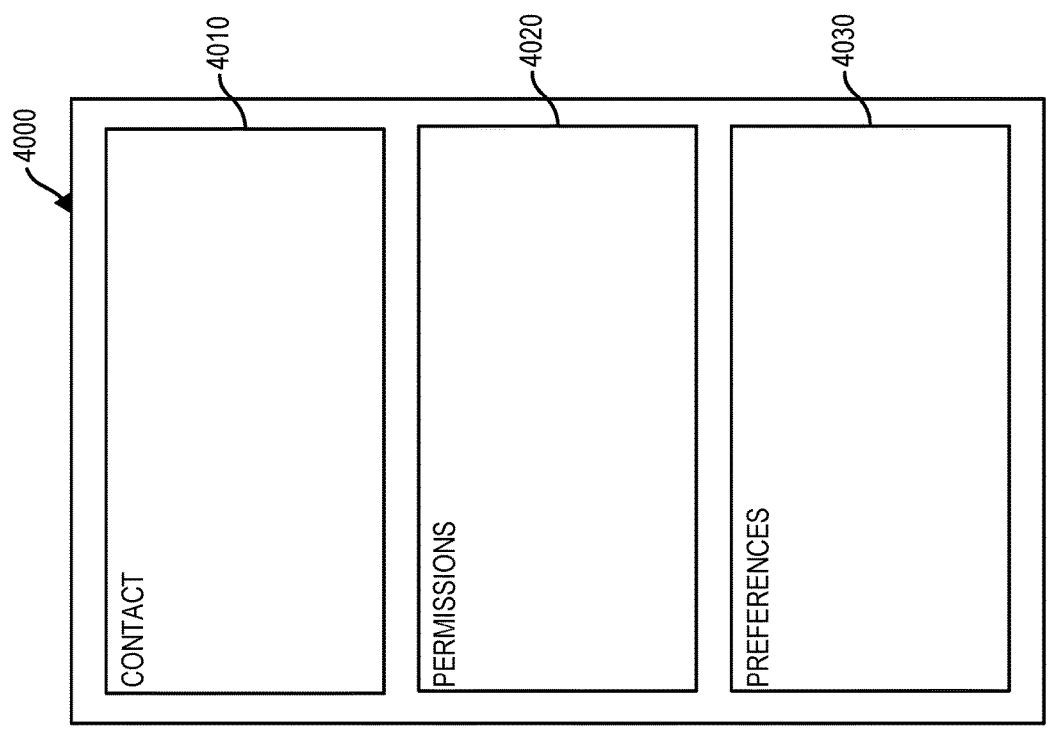
FIG. 4A is a user interface for display on a display of the UE device according to one embodiment.

Values for a user's preference level for various topics can be stored in users area 241 of data repository 240 and such values can be iteratively updated through the course of deployment of system 1000. VM 220 can be configured to determine a user's preference level of various topics by examining data such as posts and message data of social media system 500 associated to respective users of system 1000. The social media data of a user can include social media data of the user during a current media streaming session, or historical location social media data of the user, e.g. social media data of a user prior to the current media streaming session. VM 220 can activate NLP process 235 to extract topics from text based posts of a user and from text based messages of user. VM 220 can also determine preferences of a user by examining an online browsing history of a user as may be obtained from UE device 10A on permission grant from a user. The online browsing data of a user can include online browsing data of the user during a current media streaming session, or historical online browsing data of the user, e.g. online browsing data of a user prior to the current media streaming session. VM 220 can activate NLP process 235 to subject text based content of websites visited by a user to NLP processing to extract topics from webpages. VM 220 can further be configured to ascertain a user's preference level for a certain topic by examining data entered in preferences area 4030 of user interface 4000 as shown in FIG. 4A. VM 220 for determination of a user preference for a certain topic can also examine location data of a user to ascertain places travelled to by the user. The location data can include location data of a user during a current media streaming session, or historical location data of the user, e.g. of locations visited by a user prior to the current media streaming session. VM 220 can reference a location to topic interest mapping decision data structure as shown in Table E that maps topic interests to places visited.

TABLE E

| Row | Place Visited | Topic |
| --- | --- | --- |
| 1 | Sports venue | Sports |
| 2 | Video Gaming Venue | Video Gaming |
| 3 | Library | Reading |
| 4 | Lake | Boating |
| ... | ... | ... |

For example, in such a database there can be mapped to sporting event venues a preference for sporting events there can be mapped to video gaming venues a preference for video gaming and there can be mapped to locations of libraries with a preference of "book reading" to a lake, the topic interest of "boating". VM 220 can score a user's interest in a certain topic according to one embodiment using a formula that takes into account a count of identification of the certain topic, a count of total number of topics extracted, as well as a rate of the identification of a certain topic. More recent identifications of the certain topic can be weighed more heavily than aged topics. According to one embodiment, more recent identifications of the certain topic identified during a current media streaming session can be weighed more heavily than aged topics. Thus, topics that are of upwardly trending interest to a user can be assigned high positive interest strength scores. In some embodiments, preferences of a user can be based on sensor output data of UE device 10A in addition to a location sensor. For example, where a health biometric sensor indicates regular exercise, "exercise" can be extracted as positive preference topic of the user. Where an environmental condition sensor consistently tracks outside air temperature, "outdoors" can be registered as a preference topic of a user. The health biometric sensor data of a user used for determining a user preference can include health biometric sensor data output during a current media streaming session, and/or can include historical health biometric sensor data of the user, e.g. output and collected prior to the current media streaming session. VM 220 can track instances of identifications of topics and can plot instance counts of topic identifications within successive time periods of a current media streaming session. VM 220 can plot regression lines for respective topics and can use regression analysis to predict a topic preference level during a successive time period.

At action decision block 2208, VM 220 can use slice selection processes described in connection with block 2204 for return of slice selection data. In the performance of action decision block 2208, VM 220 can be requesting and receiving slice data as described in connection with block 2201 from slice registry 270, e.g. referencing network slices that are currently active and available. At action decision block 2208, VM 220 can determine that performance of system 1000 can be improved by adjusting parameter values of a current slice supporting data communications of a current media streaming session or can determine that performance of system 1000 can be improved with the transitioning of communications involving one or more of UE device 10A, VM 220 (edge instance), and/or VM 220 (core instance) to a new network slice. VM 220 performing action decision block 2208 can include VM 220 returning an action decision to return slice selection data to modify the provisioning of slices currently supporting a current media streaming session. The slice selection data can include slice selection data to adjust parameter values associated to a current slice through which one or more of UE device 10A, VM 220 (edge instance), and/or VM 220 (core instance) are currently communicating or slice data to cause one or more of UE device 10A, VM 220 (edge instance), and/or VM 220 (core instance) to communicate over a newly selected network slice. According to one scenario, session user data sent at block 1002 can include session data that includes new media streaming selections of a user. For example, the user can enter into a user interface of UE device 10A data specifying selection of an additional one or more media stream or can delete media streams or change media streams.

At action decision block 2208, VM 220 can be querying instances of predictive model 6002 and predictive model 6004 in order to ascertain predicted performance of various candidate network slices. On completion of action decision block 2208 and on the condition that slice selection data is returned on the performance of action decision block 2208, VM 220 can proceed to block 2209. At block 2209, VM 220 can send slice selection data for receipt by NSMF 260. Receipt of the slice selection data sent at block 2209, NSMF 260 can proceed to block 2603. At block 2603, NSMF 260 can perform any slice adjusting, e.g. slice parameter adjusting in accordance with any slice parameter adjusting specified in the selections slice selection data sent at block 2209. Slice adjusting at block 2603 can include, e.g. parameter value adjusting to increase a bandwidth parameter value of slice supporting reading of streaming transmissions from VM 220 to UE device 10A. In the case session user data sent at block 1002 specifies a set of media streams determined with use of streaming media Table data (Table B). With use of predictive instances of predictive model 6002 to be optimized for transmission using a slice having a bandwidth parameter value increased. In the case slice selection data sent at block 2209 specifies one or more new slice NSMF 260 at blocks 2604 and 2605 can send slice credential data for receipt by UE device 10A and VM 220 so that UE device 10A, VM 220 (edge instance) if present, and VM 220 (core instance) are configured to appropriately communicate over any new slice specified with slice selection data sent at block 2209. Subsequent data communications can over one or more slice subject to parameter value adjustment or over a new slice in dependence on the slice selection data sent block 2205. VM 220 at block 2209 can specify a new slice where slice data received at block 2208 from NSMF 260 specifies one or more restriction that indicates that current slice is incapable of supporting current requirements.

At action decision block 2208, VM 220 can be examining output data from the described regression analysis to ascertain topic preference levels for a subsequent time period for a current media streaming session, and can use the decision data structure of Table F for return of slice selection data.

TABLE F

| Row | Topic | Condition | Action |
| --- | --- | --- | --- |
| 1 | Video Gaming | $P_{NEXT} > X.X$ | Increase bandwidth XX units, isolate uplink and downlink traffic |
| 2 | Sports | $P_{NEXT} > X.X$ | Increase bandwidth XX units |
| ... | ... | ... | |

Using Table F, VM 220 can provide slice selection data in dependence of identified trending topics. For example, referring to Row 1, VM 220 can predict using the described regression analysis that during a subsequent time period during a current media streaming session a topic strength for "video gaming" will exceed a threshold and can responsively increase a bandwidth parameter value for a network slice that supports VM 220 to UE device 10A traffic, and can responsively provide slice selection data for selecting a new slice (if not preexisting) so that traffic from UE device 10A to VM 220 is isolated from VM 220 to UE device 10A traffic and sent over a dedicated and isolated slice (e.g. a slice shown generically as slice A003, A008, A011 of FIGS. 2A-2E).

In another aspect, VM 220 performing action decision block 2208 can include VM 220 determining whether VM 220 should be relocated, e.g. to edge computing environment 100A in the case VM 220 is currently running within core computing environment 200. For example, during performance of the current media streaming session determined optimal bandwidth for support of a current media streaming session which can be determined by VM 220 using slice selection processes described with reference to block 2204 to be no longer appropriately supported by a current network slice for facilitation of streaming media between VM 220 (core instance) to UE device 10A. Accordingly, an action decision returned at block 2208 can include an action decision to transition hosting of a current media streaming session from VM 220 (core instance) within core computing environment 200 to VM 220 (edge instance) within edge computing environment 100A. In response to such a determination, VM 220 can initiate messaging, e.g. to authority 215 and/or authority 115. The hosting of a current media streaming session is transferred to VM 220 within edge computing environment 100A and further so that VM 220 is instantiated within edge computing environment 100A if it is not currently instantiated.

At block 2210, VM 220 can return to block 2206 to continue to transmit multiple media streams for receipt by UE device 10A with second and subsequent iterations of block 2206. VM 220 can include with any media stream being streamed command data for commanding UE device 10A to behave in a manner specified by the action decision block 2208 to output a user perceivable output to a user.

Figures 5A, 5B, 5C:
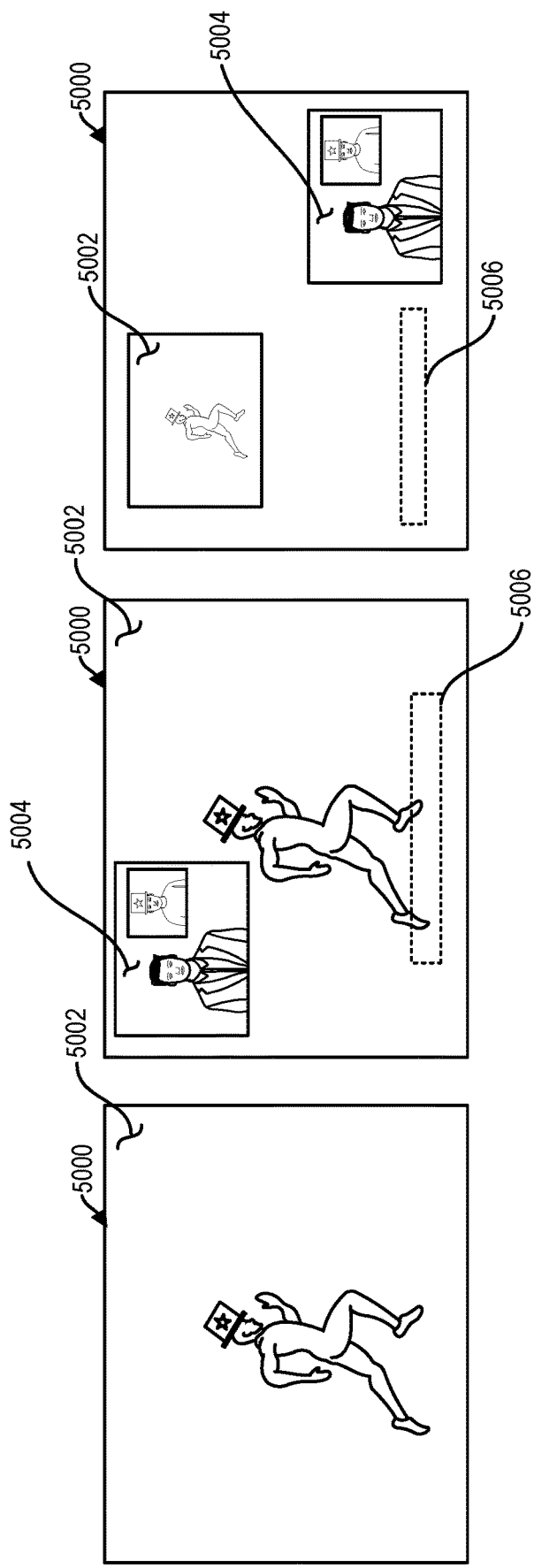
FIGS. 5A-5C depict various features for presentment of a user perceivable output according to various embodiments.

FIGS. 5A-5C illustrate display 5000 of UE device 10A that can be displaying or more simultaneously streamed media streams streamed at block 2209. In a default mode, as illustrated by FIG. 5A, a primary media stream can be displayed in area 5002 which in the default mode depicted in FIG. 5A can consume an entire area of display 5000. Based on the returned action decision returned at block 2211, VM 220 can encode command data specifying actions of the action decision in one or more media stream streamed at block 2209. Based on the action decision of Row 2 of Table C being returned, UE device 10A can display on display 5000 text area 5006 displaying a prompt notification prompting the user that another currently available media stream of the current session is streaming content having a topic that matches a topic of the primary media stream being displayed in area 5002. The prompt notification displayed in area 5006 can be a text-based notification that describes the topic, which topic can be a general topic or a specific topic, e.g. keyword topic. The notification displayed in area 5006 can present a textual description of the matching topic and an identifier for the media stream in which the matching topic was identified. Based on the action decision of Row 3 of Table C being returned, UE device 10A can display on display 5000 the depicted window having area 5004. When Row 3 of Table C is fired, display 5000 can simultaneously auto-present and display a first media stream in area 5002 as depicted in FIG. 5B with area 5004 as depicted in FIG. 5B. Area 5002 and area 5004 can display first and second different media streams identified as having matching topic. In the illustrated example, area 5002 can be displaying first stream live event media stream featuring the action character HAT WEARING HERO extracted as a topic from the first stream and area 5004 can be displaying a second stream live news report media stream featuring the same action character HAT WEARING HERO extracted as a topic from the second stream. Topics can be extracted and matched from recorded media and/or live event media streams.

On the detection of a matching topic with Row 3 of Table C fired, display 5000 can alternatively switch to the split screen view of FIG. C where area 5002 displaying the first stream and area 5004 featuring the second matched stream are displayed in different windows, In the case Row 4 of Table C is fired, a user can be presented a notification in area 5006 (FIGS. 5B and 5C) which can be active notification so that when actuated, streams from another session can be simultaneously displayed in display 5000. In one use case scenario as described in connection with Table D an action decision returned at block 2208 can include an action decision to notify a user that a topic of interest to the user has been identified in a transmitted media stream independent of any topic matching performed by VM 220. Such a notification can be presented as a text based notification in text area of the display 5000 as depicted in FIG. 5A. In the case the action decision of Row 2 of Table D is fired (notification independent of matching) a text notification can be displayed in an area of display 5000 such as area 5006 of FIGS. 5B and 5C. In the case Row 3 of Table D is fired, the identified stream having a topic of interest can be auto-presented in a window on display 5000 such a as window having area 5004 depicted in FIG. 5B. In the case Row 4 of Table D is fired, a user can be presented a notification in area 5006 (FIGS. 5B and 5C) which can be active notification so that when actuated, streams from another session can be simultaneously displayed in display 5000. In all cases where a notification is presented e.g. in area 5006 the notification can be an activate notification, e.g. as in a user interface button so that by actuating the notification, stream(s) specified by the notification can be presented in response to the actuation. In all cases where a notification is presented e.g. in area 5006 the notification can be replaced by an auto-present feature wherein stream(s) designated to be specified by a notification are auto-presented to a user on display 5000. There is set forth herein, according to one embodiment, a method that includes transmitting, during a media streaming session, streaming media to a UE device of a user, the transmitting streaming media including simultaneously transmitting a first media stream and a second media stream to the UE device; subjecting the first media stream to processing by natural language processing to provide a topic extracted from the first media stream; subjecting the second media stream to processing by natural language processing to provide an extracted topic extracted from the second media stream; identifying a match between the topic and the extracted topic; and providing one or more output in response to the identifying the match between the topic and the extracted topic. There is also set forth herein a method wherein the transmitting a first media stream and the second media stream to the UE device is performed by a VM running in an edge computing environment, wherein the method includes determining using data from the user equipment device obtained during the media streaming session that a preference level of the user in a certain topic exceeds a threshold, examining a certain media stream transmitted by the VM to a second user equipment device to extract a particular topic from the certain media stream and providing the user a user interface control to initiate playback of the certain media stream in response to identifying a match between the certain topic and the particular topic.

Referring again to the flowchart of FIG. 3, it can be seen that until a media streaming session is terminated, e.g. by user interface action of a user VM 220 can iteratively perform the blocks 2206 to 2210. Accordingly, VM 220 can iteratively be performing matching process of block 2207 and the action decisions of block 2208 iteratively over time during the time that a media streaming session is active. Accordingly, it can be seen that VM 220 can activate numerous different user perceivable outputs that are dynamically presented over the course of a media streaming session. The user perceivable outputs can dynamically vary over time over the course of a media streaming session in dependence on a variety of inputs including inputs provided by sensor output data output by one or more sensor within UE device 10A. VM 220 iteratively performing the loop of blocks 2206 to block 2210 can iteratively be adjusting one or more network slice for support of a current media streaming session and can be dynamically selecting new slices for support of communications of a current media streaming session.

Various available tools, libraries, and/or services can be utilized for implementation of predictive models herein such as predictive models shown in FIGS. 6A-6C. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training the predictive models of FIGS. 6A-6C can include use of e.g. support vector machines (SVM), Bayesian networks, neural networks and/or other machine learning technologies.

Embodiments herein, in one aspect, can observe and infer real time events from streaming media captured at a head end of a Content Delivery Network (CDN) and can publish information on events for in real-time (e.g. without substantial user perceivable delay). Items that can be captured can include e.g. news related to well known persons, comments being published about enterprise entities, emergency conditions and the like.

Embodiments herein set forth to analyze and provide insights on content being delivered by the CDN. Insights can be provided to users and service providers. Embodiments herein can feature real time matching of media contents as they are broadcasting based on e.g. time, situation, location, user profile. Embodiments herein recognize that existing approaches for delivery of multiple media streams can result in multiple delivered streams that exhibit discrepancy across channels about their content types with respect to time.

Embodiments herein can feature smart channel monitoring tools and can identify insights from content delivered by media channels. Media stream data can be converted to textual format for processing. Embodiments can feature analyzing contents delivered to carve information insights, detecting for related and matching contents delivered on other channels based on derived insights, communicate with service providers detailing the content delivery for such matching or related contents and passing the information about the contents automatically when operated in a network operations center (NOC) mode. Embodiments can collect information related e.g. to the local culture, user profiles, user interest, financial profiling, travel details, etc. and impact of the news and content relative candidates can be informed/actuated based on the impact. Embodiments herein can learn from a user profile, history and can provide an efficient way for content broadcast systems providing information awareness to content distribution channels.

Embodiments herein can use software defined network (SDN) and network function virtualization (NFV) features to dynamically expand the capacity of a CDN in an NOC mode. Embodiments herein can feature deployments with related content feeds to adapt/remove based on change in demands with the end user and can configure networking accordingly. Embodiments herein can communicate with a content delivery server and fetch a media stream, related metadata, stream delivery schedule. Embodiments herein can provide alerts if some of the scheduled contents are related and suitable based on the time, situation, and nature of the contents and can notify users and content delivery servers to communicate the substance to appropriate users who will benefit from the information.

A graphical user interface (GUI) based interface termed as "AI based on the fly prompt identifier" (ABOFPI) can perform the following: An ABOFPI can enable a centralized real-time pub-sub model which can be configured by the users of interest. Such users can be individual user and enterprise agent users. A captured topic can be received by an auto generator for a training set for classifying. The ABOFPI can initiate capture at a head end and keep classifying for the topics. When the match is identified, it on the fly triggers notification to the user. The ABOFPI can dynamically or on demand switch to an identified matching channel in real time where the topic is matched. When multiple channels are triggered at the same time, the ABOFPI can invoke a multi screen feature in the device to stream the channels which deliver the topics displaying the text. The ABOFPI can dynamically check user profiles, interests, activities and the like for iterative classifying topics. When a match or relevance is identified, the ABOFPI can trigger notification to the user. The ABOFPI can dynamically identify shopping details of the user and uses the data in classifying the topics. When a match or relevance is identified, the ABOFPI can trigger notification to the user. The ABOFPI can dynamically checks user details such as an itinerary and can use the data in classifying the topics. When a match or relevance is identified, the ABOFBI can trigger notification to the user. The ABOFPI can use SDN and NFV features to detect for the required capacity of CDN. The ABOFPI can autonomously expand CDN capabilities based on demand change detected with end user.

A CDN can include several servers which are responsible to provide the contents to the end users when requested. A Fifth generation (5G) network can be connected to the CDN via a media gateway which interlinks the CDN and 5G network in order to reach the end user. A real-time network can be provided where the data gets captured from news reads and other channels which are delivered to the World Wide Web, television or any other news network, end user's devices or can be a part of service orchestration layer based on the implementation. Embodiments can communicate with the content delivery server to fetch a media stream along with the delivery metadata. Upon reception of the stream and metadata, the stream can be converted to textual format using existing mechanism of voice to text conversion and AI based system uses classification. Training mechanisms can be used to extract the entities, recognize the emotions and map them with user profile, user interest, buying pattern, financial information, local rules, local culture, affected areas, people set, etc. and detect the contents being delivered by other channels and generate the rules for the media contents pulled from stream. The policy engine can map the AI engine's information with the related or matching information along with several other parameters defined to activate a trigger to communicate the user and all other service providers having matching or related media contents.

Certain embodiments herein may offer various technical computing advantages involving computing advantages to address problems arising in the realm of computer networks and systems. Embodiments herein can feature improved performance of a computer network in facilitating a media streaming session in which media streaming data is delivered to a user. Embodiments herein can feature optimization of a hosting location for a media streaming node and intelligent selection of a network slice for support of the media streaming session. Embodiments here can feature dynamic adjusting of a network slice during a runtime of the media streaming session, as well as the selecting of new slices for optimizing performance of a media streaming session. Embodiments herein can include computer network features for improved synchronization of transmitted media streams so that first and second time segments associated, respectively, to first and second media streams that are transmitted by a hosting media streaming node are received by a user equipment (UE) device at a common receive time. Embodiments herein can also feature dynamically hosting of media streaming session during a run time of a media streaming session. Various decision data structures can be used to drive artificial intelligence (AI) decision making, such as decision data structure that cognitively maps data extracted from social media interactions to action decisions for the delivery of streaming media. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, including machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 7:
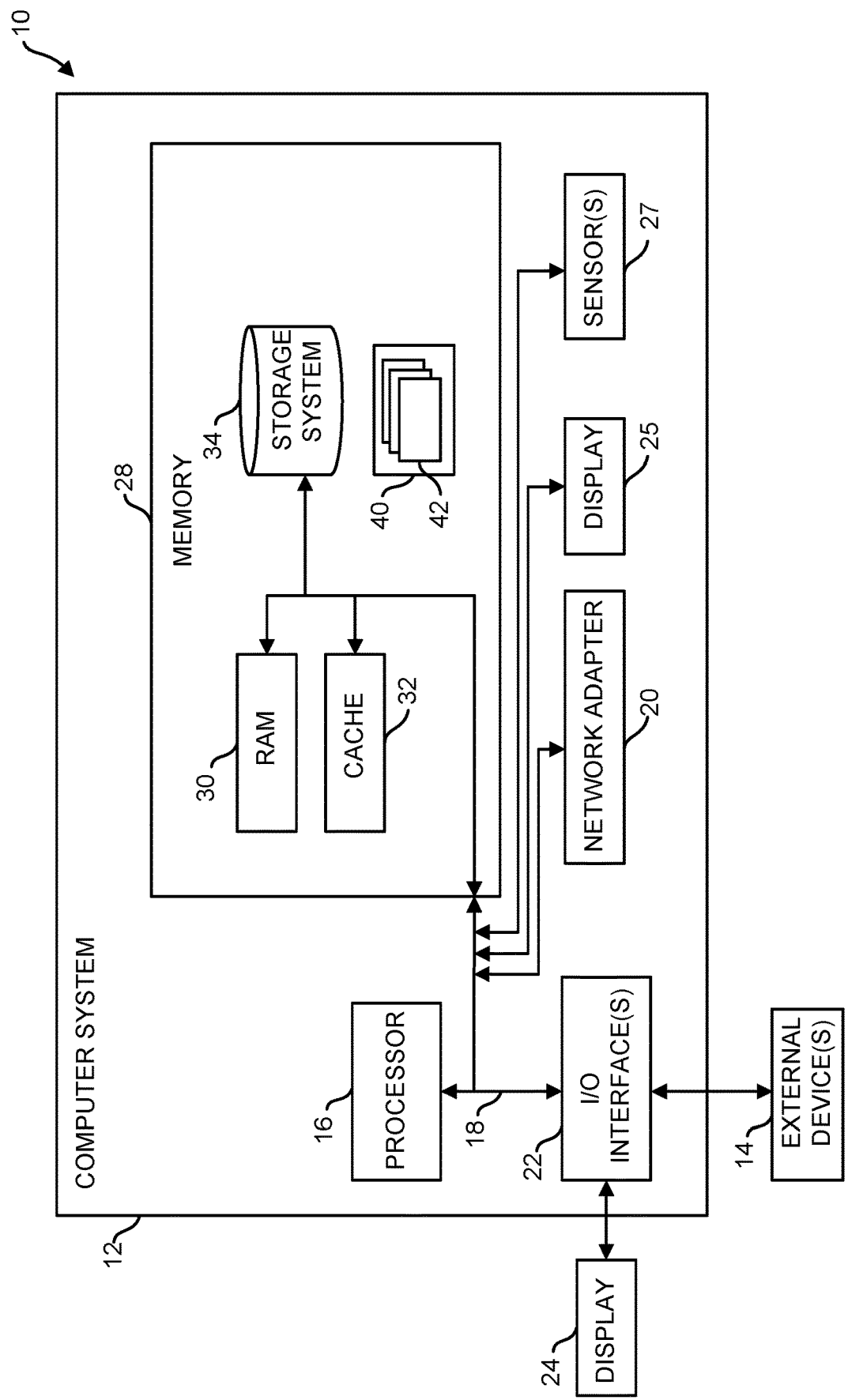
FIG. 7 depicts a computing node according to one embodiment.
Figure 8:
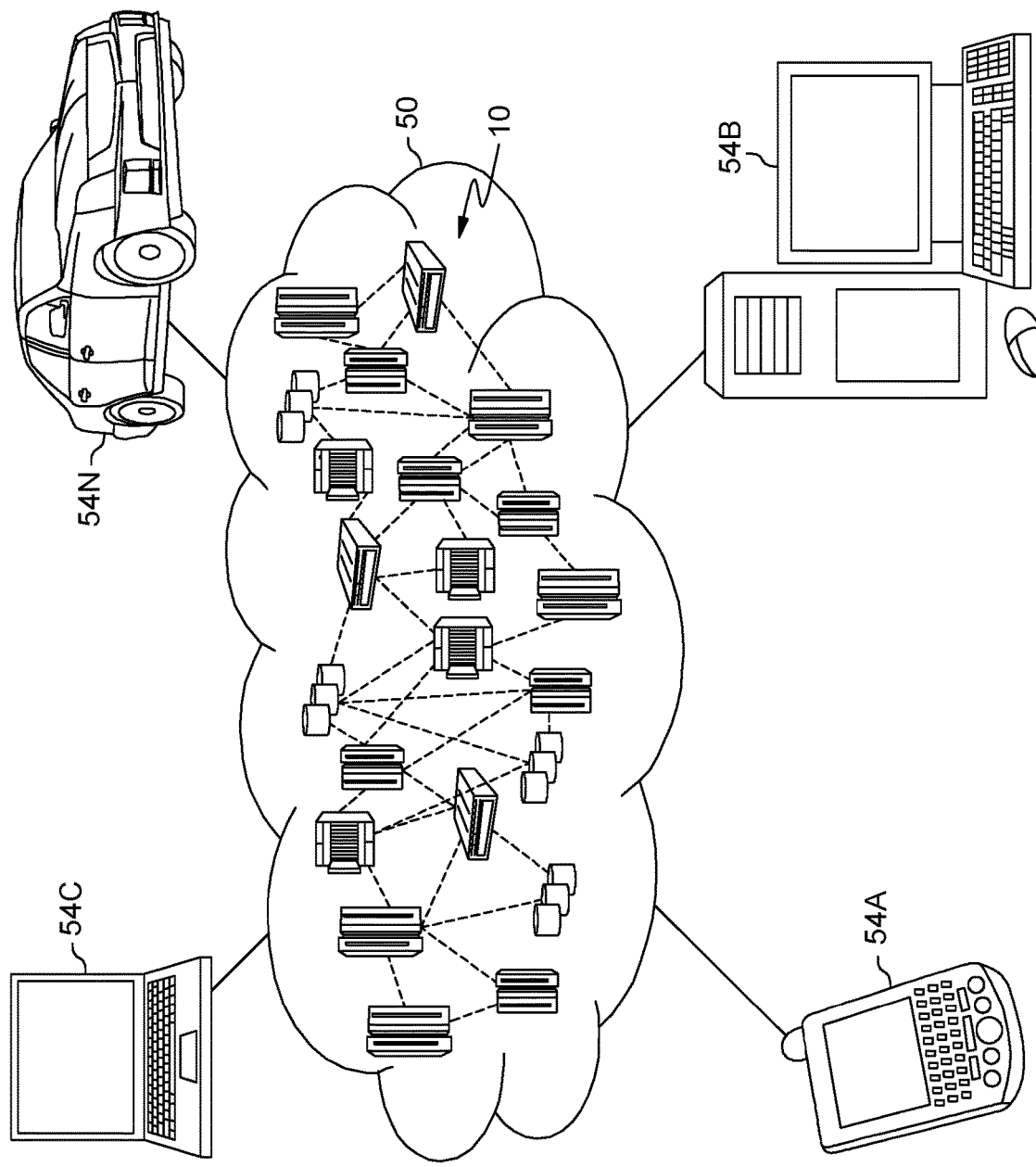
FIG. 8 depicts a cloud computing environment according to one embodiment.
Figure 9:
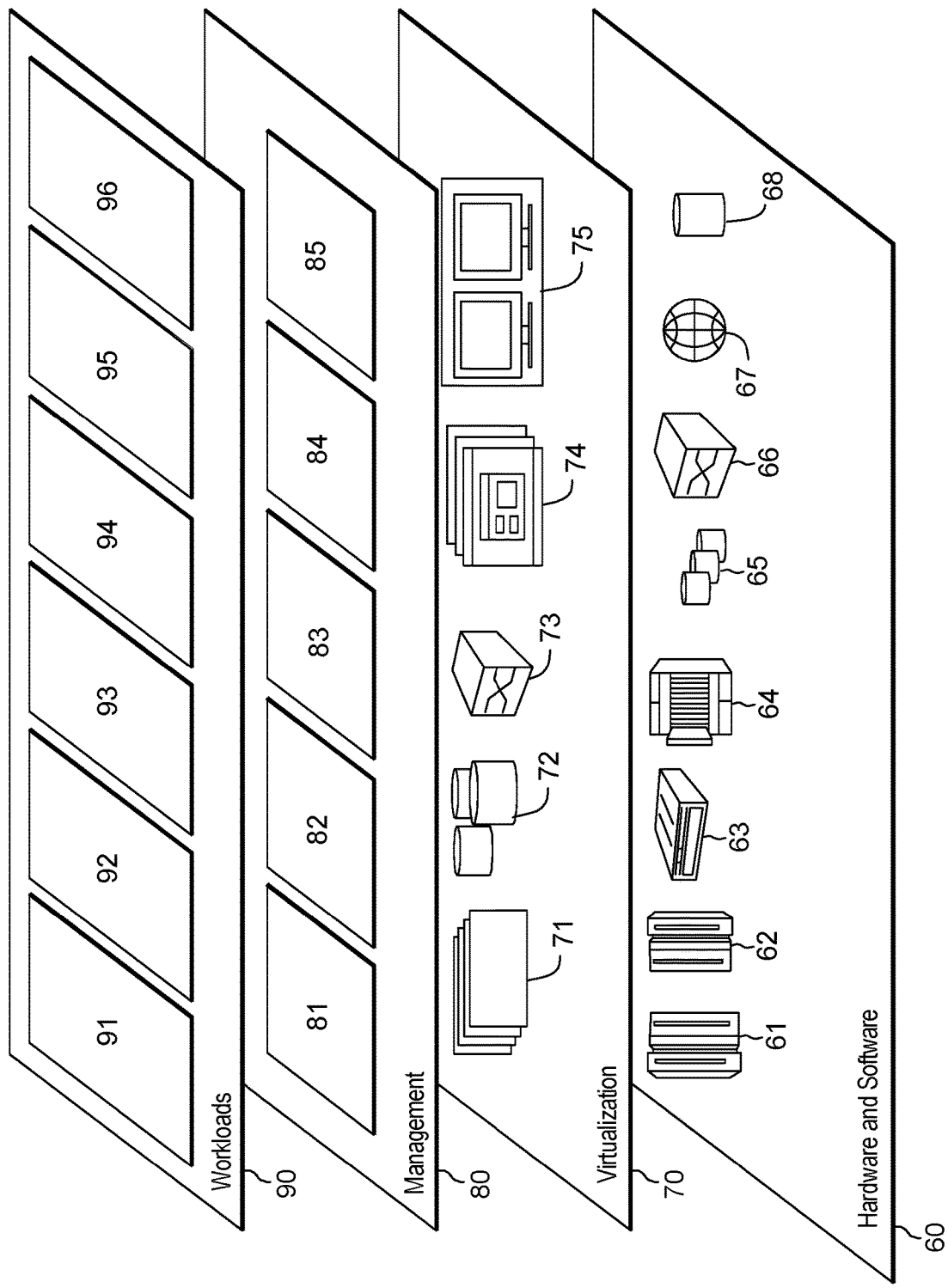
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, system 1000 can include one or more computing node 10 and can include one or more program 40 for performing functions described with reference to VM 220 of the flowchart of FIG. 3. In one embodiment, system 1000 can include one or more computing node 10 and can include one or more program 40 for performing functions described with reference to NSMF 260 of the flowchart of FIG. 3. In one embodiment, UE device 10A can include one or more computing node 10 and can include one or more program 40 for performing functions described with reference to UE device 10A of the flowchart of FIG. 3. In one embodiment, the computing node based systems and devices depicted in FIG. 1A can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for providing streaming media as set forth herein. The processing components 96 can be implemented with use of one or more program 40 described in FIG. 7.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
transmitting, during a media streaming session, streaming media to a user equipment (UE) device of a user, the transmitting streaming media including simultaneously transmitting a first media stream and a second media stream to the UE device, wherein the simultaneously transmitting the first media stream and the second media stream to the UE device is performed by a virtual machine (VM) running on a computing node of an edge computing environment, wherein the method includes, during the transmitting, migrating a virtual machine (VM) defining a media server from a core computing environment to an edge computing environment, wherein the VM is configured for simultaneously transmitting the first media stream and the second media stream to the UE device;
subjecting, by the VM running on the computing node of the edge computing environment, the first media stream to processing by natural language processing to provide a topic extracted from the first media stream;
subjecting, by the VM running on the computing node of the edge computing environment, the second media stream to processing by natural language processing to provide an extracted topic extracted from the second media stream;
identifying, by the VM running on the computing node of the edge computing environment, a match between the topic and the extracted topic; and
providing one or more output in response to the identifying the match between the topic and the extracted topic, wherein the first media stream is a primary media stream for primary viewing by the user, wherein the providing one or more output in response to the identifying the match between the topic and the extracted topic includes transmitting a notification to the user, wherein method includes examining a streaming media type of the first media stream, and querying a predictive model using the media type to return prediction data specifying predicted performance of a network slice configuration, and selecting a network slice using the prediction data, wherein the predictive model has been trained by machine learning using training data that comprises slice performance data from historical media streaming sessions, and wherein the method includes transmitting the first media stream over the network slice.

2. The computer implemented method of claim 1, wherein the method includes instantiating a network slice configured for persistent delivery of specified key performance indicators defined by specified slice parameter values, and wherein the transmitting streaming media includes simultaneously transmitting the first media stream and the second media stream to the UE device over the network slice.

3. The computer implemented method of claim 1, wherein the providing one or more output in response to the identifying the match between the topic and the extracted topic includes transmitting a notification to the user specifying to the user that content of interest is available to the user by viewing of the second media stream.

4. A computer implemented method comprising:
transmitting, during a media streaming session, streaming media to a user equipment (UE) device of a user, the transmitting streaming media including simultaneously transmitting a first media stream and a second media stream to the UE device;
subjecting the first media stream to processing by natural language processing to provide a topic extracted from the first media stream;
subjecting the second media stream to processing by natural language processing to provide an extracted topic extracted from the second media stream;
identifying a match between the topic and the extracted topic; and
providing one or more output in response to the identifying the match between the topic and the extracted topic, wherein the method includes instantiating one or more network slice configured for persistent delivery of one or more respective set of specified key performance indicators defined by one or more respective set of specified slice parameter values, and wherein the transmitting streaming media includes simultaneously transmitting the first media stream and the second media stream to the UE device over the one or more network slice, wherein the method includes iteratively receiving user data from the UE device during the media streaming session and dynamically adjusting parameter values of the one or more network slice during the media streaming session in dependence on the iteratively received user data, wherein the iteratively receiving user data from the UE device during the media streaming session and dynamically adjusting parameter values of the one or more network slice during the media streaming session in dependence on the iteratively received user data includes iteratively receiving sensor output user data from the UE device during the media streaming session and dynamically adjusting parameter values of the one or more network slice during the media streaming session in dependence on the iteratively received sensor output user data, wherein the method includes processing the iteratively received sensor output user data from the UE device during the media streaming session to ascertain topic preferences of the user, and predicting using the iteratively received sensor output user data from the UE device that the user's subsequent time period topic preference for a certain topic will exceed a threshold, and in response to the predicting that the user's subsequent time period topic preference for the certain topic will exceed a threshold establishing differentiated network slices for uplink and respectively downlink transmissions between the UE device and a virtual machine (VM) performing the transmitting so that traffic from the UE device to the VM is isolated from traffic from the VM to the UE device.

5. The computer implemented method of claim 4, wherein the iteratively receiving user data from the UE device during the media streaming session and dynamically adjusting parameter values of the one or more network slice during the media streaming session in dependence on the iteratively received user data includes iteratively receiving health biometric sensor output user data from the UE device during the media streaming session and dynamically adjusting parameter values of the one or more network slice during the media streaming session in dependence on the iteratively received health biometric sensor output user data, wherein the method includes iteratively deriving a preference of a user associated to the user data using the iteratively received health biometric sensor output user data, and wherein the dynamically adjusting parameter values of the one or more network slice during the media streaming session in dependence on the iteratively received health biometric sensor output user data includes dynamically adjusting parameter values of the one or more network slice during the media streaming session in dependence on the iteratively derived preference of the user iteratively derived using the iteratively received health biometric sensor output user data iteratively received from the UE device during the media streaming session.

6. The computer implemented method of claim 4, wherein the iteratively receiving user data from the UE device during the media streaming session and dynamically adjusting parameter values of the one or more network slice during the media streaming session in dependence on the iteratively received user data includes iteratively receiving location sensor output user data from the UE device during the media streaming session and dynamically adjusting parameter values of the one or more network slice during the media streaming session in dependence on the iteratively received location sensor output user data, wherein the method includes iteratively deriving a preference of a user associated to the user data using the iteratively received location sensor output user data, and wherein the dynamically adjusting parameter values of the one or more network slice during the media streaming session in dependence on the iteratively received location sensor output user data includes dynamically adjusting parameter values of the one or more network slice during the media streaming session in dependence on the iteratively derived preference of the user iteratively derived using the iteratively received location sensor output user data iteratively received from the UE device during the media streaming session.

7. The computer implemented method of claim 4, wherein the method includes dynamically adjusting parameter values of the one or more network slice during the media streaming session in dependence on a query of a trained predictive model that returns predictions on performance of the one or more network slice, wherein the trained predictive model has been trained with training datasets that include (a) state and slice parameter value(s) for a certain session associated to (b) subsequent performance metrics data for the slice for the certain session, wherein the state of the certain session is defined by a media stream selection of the user.

8. The computer implemented method of claim 4, wherein the method includes processing the iteratively received sensor output user data from the UE device during the media streaming session to ascertain topic preferences of the user, and employing regression processing for performing predicting using the iteratively received sensor output user data from the UE device that the user's subsequent time period topic preference for video gaming will exceed a threshold, and in response to the predicting that the user's subsequent time period topic preference for video gaming will exceed a threshold (a) establishing differentiated network slices for uplink and respectively downlink transmissions between the UE device and a virtual machine (VM) performing the transmitting so that traffic from the UE device to the VM is isolated from traffic from the VM to the UE device, and (b) migrating the VM to an edge computing node.

9. The computer implemented method of claim 4, wherein the method includes processing the iteratively received sensor output user data from the UE device during the media streaming session to ascertain topic preferences of the user, and predicting using the iteratively received sensor output user data from the UE device that the user's subsequent time period topic preference for a certain topic will exceed a threshold, and in response to the predicting that the user's subsequent time period topic preference for the certain topic will exceed a threshold (a) establishing differentiated network slices for uplink and respectively downlink transmissions between the UE device and a virtual machine (VM) performing the transmitting so that traffic from the UE device to the VM is isolated from traffic from the VM to the UE device, and (b) migrating the VM to an edge computing node.

10. The computer implemented method of claim 4, wherein the method includes processing the iteratively received sensor output user data from the UE device during the media streaming session to ascertain topic preferences of the user, and predicting using the iteratively received sensor output user data from the UE device that the user's subsequent time period topic preference for a certain topic will exceed a threshold, and in response to the predicting that the user's subsequent time period topic preference for the certain topic will exceed a threshold (a) establishing differentiated network slices for uplink and respectively downlink transmissions between the UE device and a virtual machine (VM) performing the transmitting so that traffic from the UE device to the VM is isolated from traffic from the VM to the UE device, and (b) migrating the VM to an edge computing node.

11. The computer implemented method of claim 4, wherein the method includes processing the iteratively received sensor output user data from the UE device during the media streaming session to ascertain topic preferences of the user, and predicting using the iteratively received sensor output user data from the UE device that the user's subsequent time period topic preference for a certain topic will exceed a threshold, and in response to the predicting that the user's subsequent time period topic preference for the certain topic will exceed a threshold migrating the VM to an edge computing node.

12. The computer implemented method of claim 4, wherein the method includes instantiating a network slice configured for persistent delivery of specified key performance indicators defined by specified slice parameter values, and wherein the transmitting streaming media includes simultaneously transmitting the first media stream and the second media stream to the UE device over the network slice.

13. The computer implemented method of claim 4, wherein the iteratively receiving user data from the UE device during the media streaming session and dynamically adjusting parameter values of the one or more network slice during the media streaming session in dependence on the iteratively received user data includes iteratively receiving health biometric sensor output user data from the UE device during the media streaming session and dynamically adjusting parameter values of the one or more network slice during the media streaming session in dependence on the iteratively received health biometric sensor output user data.

14. The computer implemented method of claim 4, wherein the iteratively receiving user data from the UE device during the media streaming session and dynamically adjusting parameter values of the one or more network slice during the media streaming session in dependence on the iteratively received user data includes iteratively receiving location sensor output user data from the UE device during the media streaming session and dynamically adjusting parameter values of the one or more network slice during the media streaming session in dependence on the iteratively received location sensor output user data.

15. A computer implemented method comprising:
 transmitting, during a media streaming session, streaming media to a user equipment (UE) device of a user, the transmitting streaming media including simultaneously transmitting a first media stream and a second media stream to the UE device;
 subjecting the first media stream to processing by natural language processing to provide a topic extracted from the first media stream;
 subjecting the second media stream to processing by natural language processing to provide an extracted topic extracted from the second media stream;
 identifying a match between the topic and the extracted topic; and
 providing one or more output in response to the identifying the match between the topic and the extracted topic, wherein the method includes instantiating one or more network slice configured for persistent delivery of one or more respective set of specified key performance indicators defined by one or more respective set of specified slice parameter values, and wherein the transmitting streaming media includes simultaneously transmitting the first media stream and the second media stream to the UE device over the one or more network slice, wherein the method includes iteratively receiving user data from the UE device during the media streaming session and dynamically adjusting parameter values of the one or more network slice during the media streaming session in dependence on the iteratively received user data, wherein the iteratively receiving user data from the UE device during the media streaming session and dynamically adjusting parameter values of the one or more network slice during the media streaming session in dependence on the iteratively received user data includes iteratively receiving user data from the UE device during the media streaming session and dynamically adjusting parameter values of the one or more network slice during the media streaming session in dependence on the iteratively received user data, wherein the method includes processing the iteratively received user data from the UE device during the media streaming session to ascertain topic preferences of the user, and predicting using the iteratively received user data from the UE device that the user's subsequent time period topic preference for a certain topic will exceed a threshold, and in response to the predicting that the user's subsequent time period topic preference for the certain topic will exceed a threshold (a) establishing differentiated network slices for uplink and respectively downlink transmissions between the UE device and a virtual machine (VM) performing the transmitting so that traffic from the UE device to the VM is isolated from traffic from the VM to the UE device, and (b) migrating the VM to an edge computing node.

16. The computer implemented method of claim 15, wherein the iteratively receiving user data from the UE device during the media streaming session and dynamically adjusting parameter values of the one or more network slice during the media streaming session in dependence on the iteratively received user data includes iteratively receiving sensor output user data from the UE device during the media streaming session and dynamically adjusting parameter values of the one or more network slice during the media streaming session in dependence on the iteratively received sensor output user data, wherein the method includes processing the iteratively received sensor output user data from the UE device during the media streaming session to ascertain topic preferences of the user.

17. The computer implemented method of claim 15, wherein the method includes:
 instantiating a network slice configured for persistent delivery of specified key performance indicators defined by specified slice parameter values, and wherein the transmitting streaming media includes simultaneously transmitting the first media stream and the second media stream to the UE device over the network slice.

18. The computer implemented method of claim 15, wherein the iteratively receiving user data from the UE device during the media streaming session and dynamically adjusting parameter values of the one or more network slice during the media streaming session in dependence on the iteratively received user data includes iteratively receiving health biometric sensor output user data from the UE device during the media streaming session and dynamically adjusting parameter values of the one or more network slice during the media streaming session in dependence on the iteratively received health biometric sensor output user data.

19. The computer implemented method of claim 15, wherein the iteratively receiving user data from the UE device during the media streaming session and dynamically adjusting parameter values of the one or more network slice during the media streaming session in dependence on the iteratively received user data includes iteratively receiving location sensor output user data from the UE device during the media streaming session and dynamically adjusting parameter values of the one or more network slice during the media streaming session in dependence on the iteratively received location sensor output user data.

20. The computer implemented method of claim 15, wherein the method includes dynamically adjusting parameter values of the one or more network slice during the media streaming session in dependence on a query of a trained predictive model that returns predictions on performance of the one or more network slice, wherein the trained predictive model has been trained with training datasets that include (a) state and slice parameter value(s) for a certain session associated to (b) subsequent performance metrics data for the slice for the certain session, wherein the state of the certain session is defined by a media stream selection of the user.

* * * * *